US012720125B2

(12) United States Patent
Wang et al.

(10) Patent No.: US 12,720,125 B2
(45) Date of Patent: Aug. 25, 2026

(54) INFORMATION PRESENTATION METHOD, ELECTRONIC DEVICE AND COMPUTER-READABLE MEDIUM

(71) Applicant: Beijing Youzhuju Network Technology Co., Ltd., Beijing (CN)

(72) Inventors: Yizhi Wang, Beijing (CN); Tao Wang, Beijing (CN); Xiaojie Feng, Beijing (CN)

(73) Assignee: Beijing Youzhuju Network Technology Co., Ltd., Beijing (CN)

(*) Notice: Subject to any disclaimer, the term of this patent is extended or adjusted under 35 U.S.C. 154(b) by 0 days.

(21) Appl. No.: 18/867,794

(22) PCT Filed: Oct. 31, 2023

(86) PCT No.: PCT/CN2023/128274
§ 371 (c)(1),
(2) Date: Nov. 20, 2024

(87) PCT Pub. No.: WO2024/093984
PCT Pub. Date: May 10, 2024

(65) Prior Publication Data

US 2025/0365453 A1 Nov. 27, 2025

(30) Foreign Application Priority Data

Oct. 31, 2022 (CN) ......................... 202211347815.8

(51) Int. Cl.
*H04N 21/2187* (2011.01)
*H04N 21/466* (2011.01)

(52) U.S. Cl.
CPC ..... *H04N 21/2187* (2013.01); *H04N 21/4668* (2013.01)

(58) Field of Classification Search
CPC ....................... H04N 21/2187; H04N 21/4668
See application file for complete search history.

(56) References Cited

U.S. PATENT DOCUMENTS

2008/0148173 A1* 6/2008 Johnson ................ G06Q 30/02 715/779
2022/0021933 A1 1/2022 Osman et al.
(Continued)

FOREIGN PATENT DOCUMENTS

CN 111382355 A 7/2020
CN 111783001 A 10/2020
(Continued)

OTHER PUBLICATIONS

International Patent Application No. PCT/CN2023/128274; Int'l Search Report; dated Jan. 31, 2024; 3 pages.
(Continued)

*Primary Examiner* — Nnenna N Ekpo
(74) *Attorney, Agent, or Firm* — BakerHostetler

(57) ABSTRACT

An information presentation method, an electronic device, and a computer-readable medium are provided, the method includes: presenting a live streaming entry aggregation interface, in which the live streaming entry aggregation interface presents a plurality of candidate live streaming entry identifications; and in response to a trigger operation for the live streaming entry aggregation interface, determining a target live streaming entry identification from the plurality of candidate live streaming entry identifications, and presenting a channel page corresponding to the target live streaming entry identification; in which the channel page includes a live streaming preview region, a live streaming entry recommendation region and a recommended information flow presentation region.

18 Claims, 11 Drawing Sheets

(56) References Cited

U.S. PATENT DOCUMENTS

| | | | | |
|---|---|---|---|---|
| 2022/0095018 | A1 | 3/2022 | Richman et al. | |
| 2025/0039497 | A1* | 1/2025 | Zhang | G06F 16/9574 |
| 2025/0220263 | A1* | 7/2025 | Li | H04N 21/472 |

FOREIGN PATENT DOCUMENTS

| | | | |
|---|---|---|---|
| CN | 306085847 | S | 10/2020 |
| CN | 112399200 | A | 2/2021 |
| CN | 113286201 | A | 8/2021 |
| CN | 113468370 | A | 10/2021 |
| CN | 113794894 | A | 12/2021 |
| CN | 114095741 | A | 2/2022 |
| CN | 114302160 | A | 4/2022 |
| CN | 114579021 | A | 6/2022 |
| CN | 114697727 | A | 7/2022 |
| CN | 114786039 | A | 7/2022 |
| WO | WO 2020/000973 | A1 | 1/2020 |
| WO | WO 2021/066889 | A1 | 4/2021 |
| WO | WO 2021/249494 | A1 | 12/2021 |

OTHER PUBLICATIONS

Japan Patent Application No. 2024-574652; Notice of Reasons for Refusal; dated Oct. 7, 2025; 11 pages.

China Patent Application No. 202211347815.8; Office Action; dated Nov. 6, 2025; 15 pages.

China Patent Application No. 202211347815.8; Second Office Action; dated Jan. 26, 2026; 16 pages.

* cited by examiner

Fig. 1

INFORMATION PRESENTATION METHOD, ELECTRONIC DEVICE AND COMPUTER-READABLE MEDIUM

This application is a national phase filing of International Patent Application No. PCT/CN2023/128274 filed Oct. 31, 2023, which claims priority to Chinese Patent Application No. 202211347815.8, entitled “Information presentation method and apparatus, electronic device, and computer-readable medium”, filed to China Patent Office on Oct. 31, 2022, disclosures of which are incorporated herein in their entireties.

TECHNICAL FIELD

The present disclosure relates to the field of Internet technology, and more particularly to an information presentation method and apparatus, an electronic device, and a computer-readable medium.

BACKGROUND

Live streaming is a kind of information network publishing manner with a bidirectional flow process in which the information is produced and published synchronously with the occurrence and development of events.

With the rapid development of live streaming technology, the application field of live streaming is wider and wider. For example, in a live streaming room, a streamer may introduce some commodities to viewers of the live streaming room, and the viewers may place orders for the commodities in the live streaming room.

However, how to perform live streaming presentation is an urgent technical problem to be solved.

SUMMARY

In order to solve the above technical problem, the present disclosure provides an information presentation method and apparatus, an electronic device, and a computer-readable medium.

In order to achieve the above purpose, the technical solutions provided by the present disclosure are as followings.

The present disclosure provides an information presentation method, the method comprises:

- presenting a live streaming entry aggregation interface, in which the live streaming entry aggregation interface presents a plurality of candidate live streaming entry identifications; and
- in response to a trigger operation for the live streaming entry aggregation interface, determining a target live streaming entry identification from the plurality of candidate live streaming entry identifications, and presenting a channel page corresponding to the target live streaming entry identification;
- in which the channel page comprises a live streaming preview region, a live streaming entry recommendation region and a recommended information flow presentation region, the live streaming preview region is configured to play a live streaming preview information flow corresponding to the target live streaming entry identification, the live streaming entry recommendation region is configured to present a recommended live streaming entry identification, and the recommended information flow presentation region is configured to present a candidate live streaming information flow.

In a possible implementation, the method further comprises:

- in response to a trigger operation for the live streaming preview region, presenting a live streaming presentation page corresponding to the target live streaming entry identification; or
- in response to a trigger operation for the recommended live streaming entry identification, presenting a live streaming aggregation page corresponding to the recommended live streaming entry identification; in which the live streaming aggregation page is configured to present a plurality of recommended live streaming information flows; the plurality of recommended live streaming information flows comprise a live streaming information flow corresponding to the recommended live streaming entry identification; or
- in response to a trigger operation for the candidate live streaming information flow, presenting a live streaming presentation page corresponding to the candidate live streaming information flow.

In a possible implementation, the live streaming aggregation page is configured to present the plurality of recommended live streaming information flows in a target ranking order; and the live streaming information flow corresponding to the recommended live streaming entry identification corresponds to a first place in the target ranking order.

In a possible implementation, after the presenting the live streaming aggregation page corresponding to the recommended live streaming entry identification, the method further comprises:

- in response to a trigger operation for a target live streaming information flow of the plurality of recommended live streaming information flows, presenting a live streaming presentation page corresponding to the target live streaming information flow.

In a possible implementation, the live streaming preview information flow presents object description information corresponding to the target live streaming entry identification;

- after the presenting the channel page corresponding to the target live streaming entry identification, the method further comprises:
- when a preset update condition is reached, switching the object description information from a first information presentation state to a second information presentation state on the channel page; in which a region occupied by the object description information in the second information presentation state on the channel page is smaller than a region occupied by the object description information in the first information presentation state on the channel page.

In a possible implementation, after the presenting the channel page corresponding to the target live streaming entry identification, the method further comprises:

- in response to a preset operation triggered for the channel page, adjusting the live streaming preview region from a triggerable presentation state to a non-triggerable presentation state, adjusting the live streaming entry recommendation region from a first presentation position to a second presentation position, and adjusting the recommended information flow presentation region from a first presentation region to a second presentation region; in which the second presentation position is higher than the first presentation position on the channel page; space occupied by the second presentation region on the channel page is greater than space occupied by the first presentation region on the channel page.

In a possible implementation, after the adjusting the live streaming entry recommendation region from the first presentation position to the second presentation position, and adjusting the recommended information flow presentation region from the first presentation region to the second presentation region, the method further comprises:

in response to a preset operation triggered for the channel page, canceling the presenting of the live streaming preview region, adjusting the live streaming entry recommendation region from the second presentation position to a third presentation position, and adjusting the recommended information flow presentation region from the second presentation region to a third presentation region; in which the third presentation position is higher than the second presentation position on the channel page; and space occupied by the third presentation region on the channel page is greater than space occupied by the second presentation region on the channel page.

In a possible implementation, after the adjusting the live streaming entry recommendation region from the second presentation position to the third presentation position, and adjusting the recommended information flow presentation region from the second presentation region to the third presentation region, the method further comprises:

in response to a preset operation triggered for the channel page, canceling the presenting of the live streaming entry recommendation region, and adjusting the recommended information flow presentation region from the third presentation region to a fourth presentation region; in which space occupied by the fourth presentation region on the channel page is greater than space occupied by the third presentation region on the channel page.

In a possible implementation, the channel page presents prompt information corresponding to the target live streaming entry identification; the prompt information is configured to describe an access operation of a live streaming presentation page corresponding to the target live streaming entry identification;

after the canceling the presenting of the live streaming preview region, the method further comprises:

in response to the access operation, presenting the live streaming presentation page corresponding to the target live streaming entry identification.

In a possible implementation, the recommended information flow presentation region presents a plurality of candidate category labels; the method further comprises:

switching the plurality of candidate category labels from a first aggregated presentation state to a second aggregated presentation state when the recommended information flow presentation region is adjusted from the second presentation region to the third presentation region; in which the plurality of candidate category labels in the first aggregated presentation state are configured for presentation in sequence in response to a preset sliding operation; and in response to a trigger operation for a control to be used corresponding to the second aggregated presentation state, presenting a category aggregation presentation page; in which the category aggregation presentation page presents a plurality of recommended category labels; and the plurality of recommended category labels comprise the plurality of candidate category labels.

In a possible implementation, the channel page satisfies at least one of following conditions:

the live streaming entry recommendation region is configured to present a recommended live streaming entry identification corresponding to at least one first category; each of the at least one first category is different;

the recommended information flow presentation region is configured to present a candidate live streaming information flow corresponding to at least one second category; each of the at least one second category is different;

a position of the live streaming preview region in the channel page is located above a position of the live streaming entry recommendation region in the channel page; a position of the live streaming entry recommendation region in the channel page is located above a position of the recommended information flow presentation region in the channel page;

a size of the live streaming preview region is equal to a sum of a size of the live streaming entry recommendation region and a size of the recommended information flow presentation region;

the recommended information flow presentation region is configured to present a plurality of candidate live streaming information flows; and the plurality of candidate live streaming information flows comprise live streaming information flows corresponding to other candidate live streaming entry identifications except for the target live streaming entry identification in the plurality of candidate live streaming entry identifications.

The present disclosure provides an information presentation apparatus, which comprises:

a first presentation unit, configured to present a live streaming entry aggregation interface, in which the live streaming entry aggregation interface presents a plurality of candidate live streaming entry identifications; and a second presentation unit, configured to, in response to a trigger operation for the live streaming entry aggregation interface, determine a target live streaming entry identification from the plurality of candidate live streaming entry identifications, and present a channel page corresponding to the target live streaming entry identification; in which the channel page comprises a live streaming preview region, a live streaming entry recommendation region and a recommended information flow presentation region; the live streaming preview region is configured to play a live streaming preview information flow corresponding to the target live streaming entry identification; the live streaming entry recommendation region is configured to present a recommended live streaming entry identification; and the recommended information flow presentation region is configured to present a candidate live streaming information flow.

The present disclosure further provides an electronic device, the device comprises a processor and a memory; the memory is configured to store instructions or computer programs; and the processor is configured to execute the instructions or computer programs in the memory to cause the electronic device to perform the information presentation method provided by the present disclosure.

The present disclosure further provides a computer-readable medium, the computer-readable medium stores instructions or computer programs, when the instructions or computer programs run on a device, the device is caused to perform the information presentation method provided by the present disclosure.

The present disclosure further provides a computer program product, which comprises a computer program carried on a non-transitory computer-readable medium, the computer program comprises program codes for performing the information presentation method provided by the present disclosure.

Compared with the prior art, the present disclosure has at least the following advantages.

In the technical solutions provided by the present disclosure, for an electronic device, when the electronic device is presenting a live streaming entry aggregation interface (for example, a top page of a mall), and the live streaming entry aggregation interface presents a plurality of candidate live streaming entry identifications (for example, live streaming account identifications, etc.), when the electronic device receives a trigger operation (for example, an operation of clicking a certain candidate live streaming entry identification, etc.) for the live streaming entry aggregation interface, the electronic device determines a target live streaming entry identification from the candidate live streaming entry identifications and present a channel page corresponding to the target live streaming entry identification (e.g., a selected live streaming page, etc.). The channel page includes a live streaming preview region, a live streaming entry recommendation region, and a recommended information flow presentation region, the live streaming preview region is configured to play a live streaming preview information flow corresponding to the target live streaming entry identification, the live streaming entry recommendation region is configured to present a recommended live streaming entry identification (e.g., an account identification of a live streaming room recommended under the categories of My follow, Brand Officials, Celebrity and Big shot, etc.), and the recommended information flow presentation region is configured to present a candidate live streaming information flow (e.g., a live streaming information flow of a live streaming room recommended under the categories of recommendation, women's dress, clothing, etc.).

It can be seen that with regard to the above channel page, the channel page not only presents the live streaming preview information flow corresponding to the target live streaming entry identification, but also presents some recommended live streaming entry identifications and some candidate live streaming information flows, so that the user can not only directly access a live streaming room identified by the target live streaming entry identification for viewing through the live streaming preview information flow, but also can enter other live streaming rooms for viewing through the recommended live streaming entry identifications and the candidate live streaming information flows. Therefore, the live viewing experience of the user can be better satisfied, and the user experience can be effectively improved.

BRIEF DESCRIPTION OF DRAWINGS

In order to more clearly describe technical solutions of the embodiments of the disclosure or the prior art, the drawings to be used in the description of the embodiments or the prior art will be briefly introduced below. It will be apparent to those skilled in the art that the drawings in the following description are only some of the disclosure, and other drawings may be obtained from these drawings without any creative work.

FIG. 1 is a flow chart of an information presentation method provided by an embodiment of the present disclosure;

DETAILED DESCRIPTION

In order to make those skilled in the art better understand the solutions of the present disclosure, the technical solutions in the embodiments of the present disclosure will be described clearly and completely in conjunction with the accompanying drawings in the embodiments of the present disclosure. Obviously, the described embodiments are only part of the embodiments of the present disclosure, rather than all of the embodiments. Based on the embodiments in the present disclosure, all other embodiments obtained by a person skilled in the art without involving any inventive effort are within the protection scope of the present disclosure.

Figure 1:
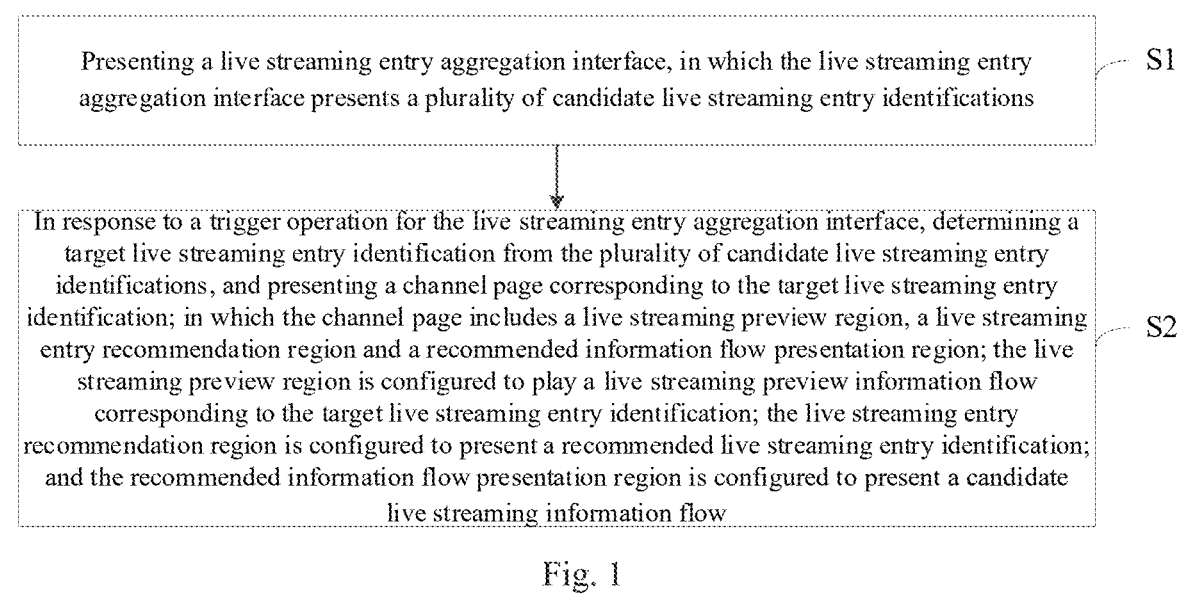

In order to better understand the technical solutions provided by the present disclosure, the information presentation method provided by the present disclosure is described below with reference to some drawings. As shown in FIG. 1, the information presentation method provided by the embodiments of the present disclosure includes the following S1-S2. FIG. 1 is a flow chart of an information presentation method provided by an embodiment of the present disclosure.

S1: presenting a live streaming entry aggregation interface, in which the live streaming entry aggregation interface presents a plurality of candidate live streaming entry identifications.

The live streaming entry aggregation interface is used to provide live streaming entries by which a user can access/enter a live streaming room. For example, the live streaming entry aggregation interface may be a page 200 shown in FIG. 2 or a page 300 shown in FIG. 3.

In addition, a plurality of candidate live streaming entry identifications are presented in the live streaming entry aggregation interface. The candidate live streaming entry identification is configured to uniquely identify a entry of a live streaming room. Moreover, the present disclosure does not limit the implemetation of the candidate live streaming entry identification. For example, the candidate live streaming entry identification may include a live streaming account identification (e.g., an identification, such as a head portrait, name, etc. of the live streaming account). As another example, it may include at least a head portrait of the live streaming account, a breathing circle for encircling the head portrait, and a live streaming room name of the live streaming account (e.g., up to 5 words are presented, with the exceeding character(s) being replaced by the character " . . . ").

Figure 2:
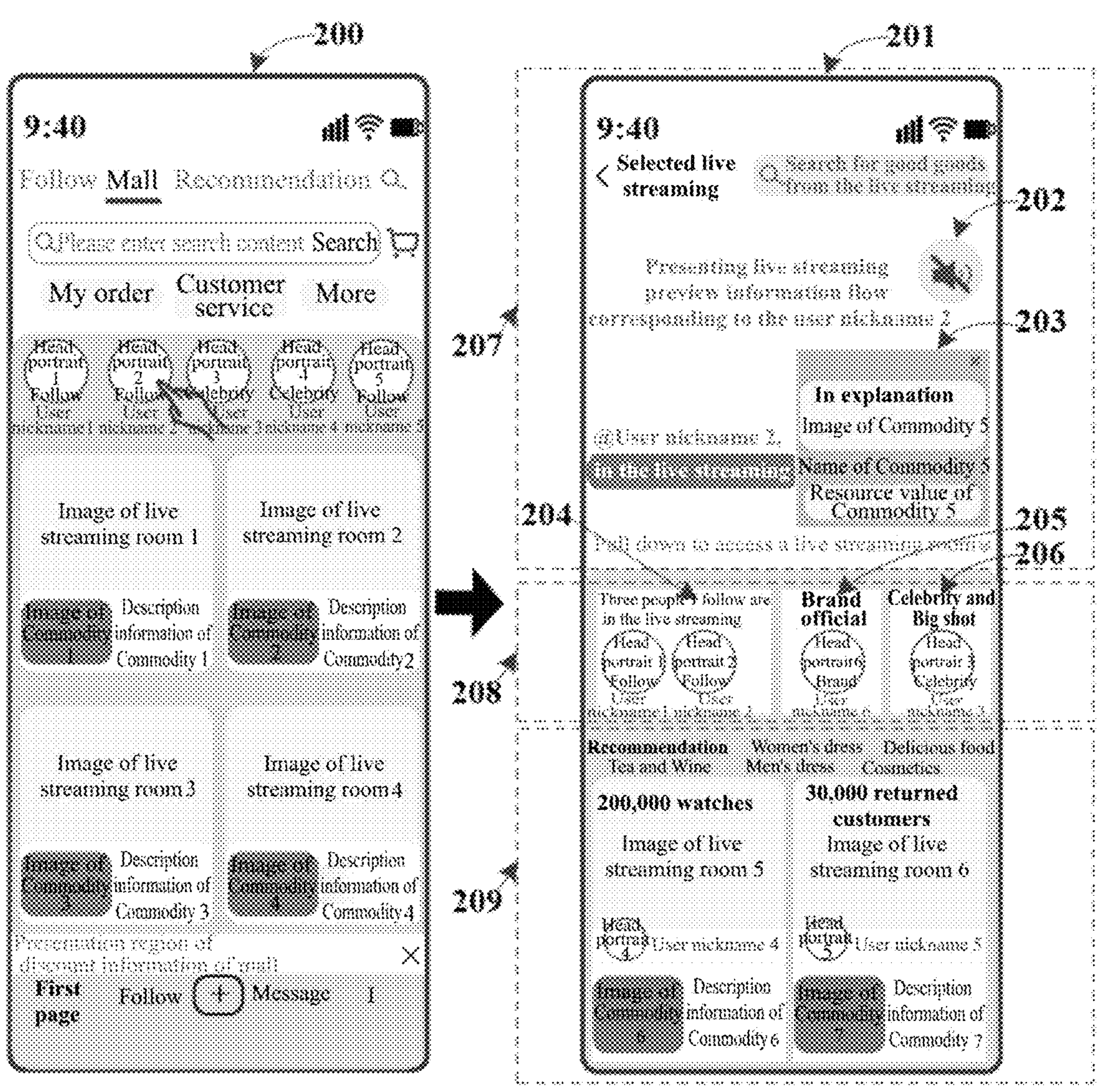
FIG. 2 is a schematic diagram of an interaction flow provided by an embodiment of the present disclosure.

Furthermore, the embodiments of the present disclosure do not limit the manner in which the plurality of candidate live streaming entry identifications are presented in the live streaming entry aggregation interface, which may be implemented, for example, in a skylight manner as shown in the page 200 of FIG. 2. As another example, it may be implemented in the form of a tile region as shown in the page 300 of FIG. 3.

S2: in response to a trigger operation for the live streaming entry aggregation interface, determining a target live streaming entry identification from the plurality of candidate live streaming entry identifications, and presenting a channel page corresponding to the target live streaming entry identification; in which the channel page includes a live streaming preview region, a live streaming entry recommendation region and a recommended information flow presentation region; the live streaming preview region is configured to play a live streaming preview information flow corresponding to the target live streaming entry identification; the live streaming entry recommendation region is configured to present a recommended live streaming entry identification; and the recommended information flow presentation region is configured to present a candidate live streaming information flow.

The trigger operation is configured to trigger a presentation process of a corresponding live streaming content of a certain candidate live streaming entry identification. Furthermore, the embodiments of the present disclosure do not limit the implementation of the trigger operation. In order to facilitate understanding, the following two cases are illustrated.

Figure 4:
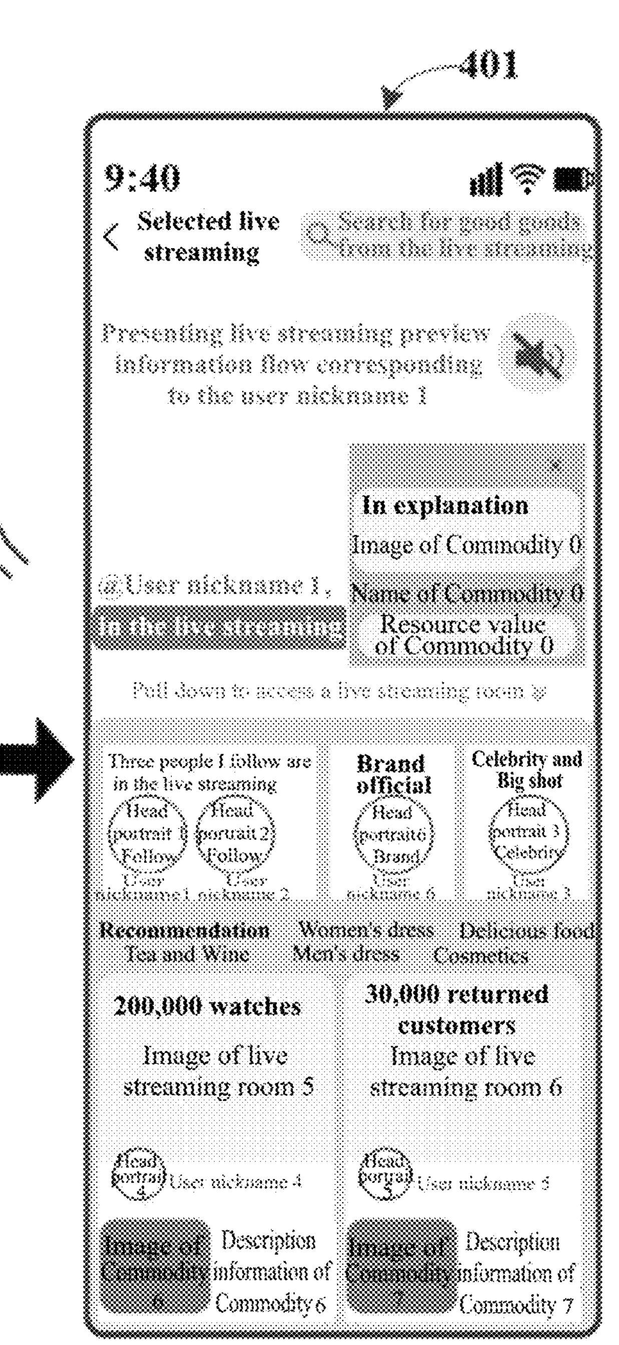
FIG. 4 is a schematic diagram of an interaction flow provided by an embodiment of the present disclosure.

Case 1, when the above live streaming entry aggregation interface presents the plurality of candidate live streaming entry identifications in a skylight manner (for example, the live streaming entry aggregation interface is the page 200 shown in FIG. 2 or FIG. 4), the above "trigger operation for the live streaming entry aggregation interface" may refer to a click operation for any one of the candidate live streaming entry identifications (for example, a click operation for an entry identification including a head portrait 2 and a user nickname 2 shown by the page 200 in FIG. 2), and may also be a click operation for a channel entry control (for example, a control "Enter Channel" shown in the page 200 of FIG. 4).

Figure 3:
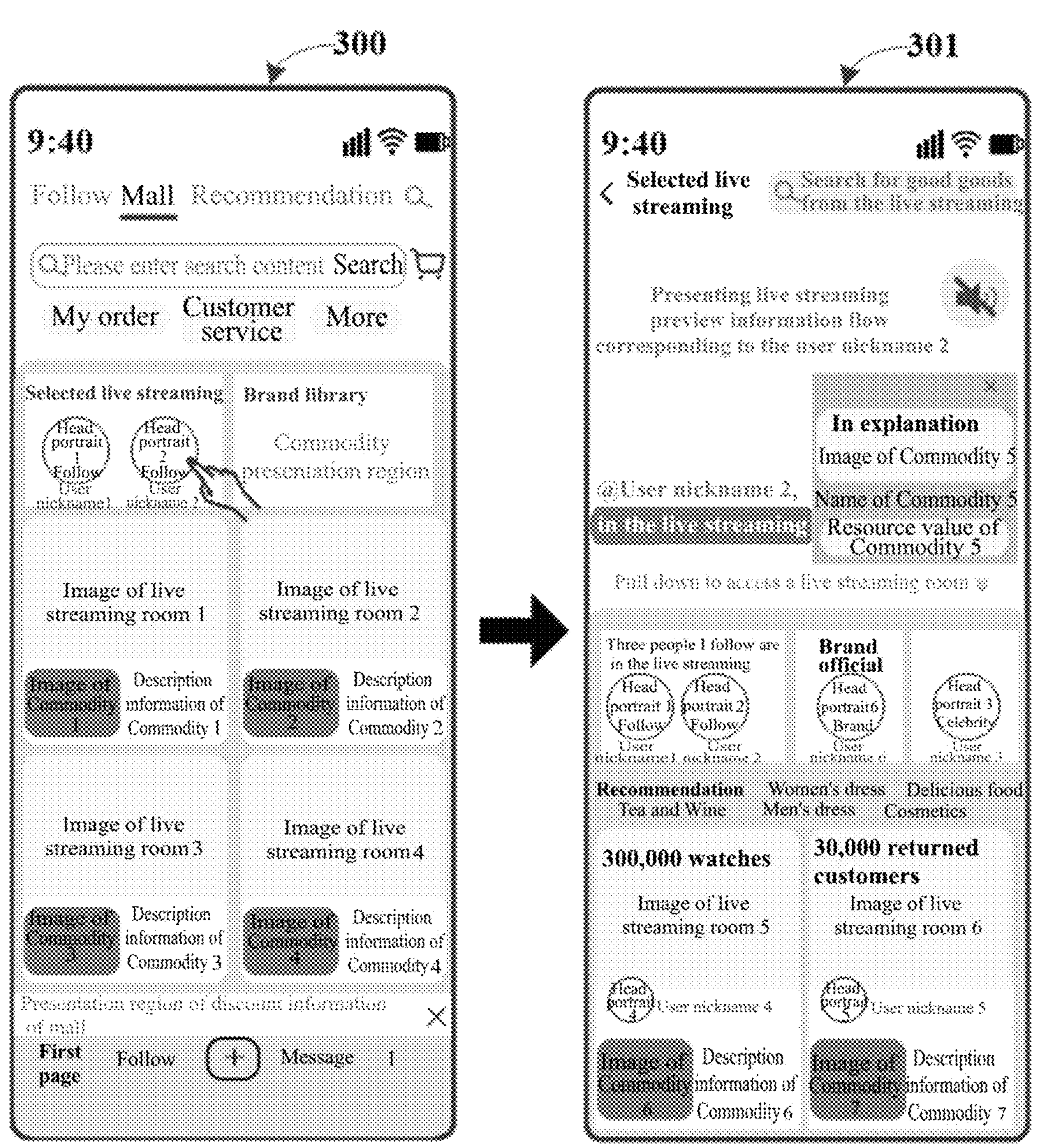
FIG. 3 is a schematic diagram of an interaction flow provided by an embodiment of the present disclosure.

In case 2, when the above live streaming entry aggregation interface presents the plurality of candidate live streaming entry identifications by means of a tile region (for example, the live streaming entry aggregation interface is the page 300 shown in FIG. 3), the above "trigger operation for the live streaming entry aggregation interface" may also refer to a click operation for any one of the candidate live streaming entry identifications (for example, a click operation for an entry identification including a head portrait 2 and a user nickname 2 shown by the page 300 in FIG. 3).

The target live streaming entry identification refers to the candidate live streaming entry identification corresponding to the above trigger operation. For example, when the trigger operation refers to a selection operation for a certain candidate live streaming entry identification in the above plurality of candidate live streaming entry identifications, the target live streaming entry identification is the selected candidate live streaming entry identification (e.g., the entry identification including the head portrait 2 and the user nickname 2 as shown in FIG. 2 or FIG. 3). As another example, when the trigger operation is a click operation on the channel entry control (e.g., the "Enter Channel" control shown in the page 200 of FIG. 4), the target live streaming entry identification is the default candidate live streaming entry identification (e.g., the first one identification in the above plurality of candidate live streaming entry identifications).

The above "channel page corresponding to the target live streaming entry identification" is configured for aggregating pages presenting live streaming content corresponding to the target live streaming entry identification and other live streaming related content. For example, when the target live streaming entry identification refers to the entry identification including the head portrait 2 and the user's nickname 2 selected by the user as shown in the page 200 of FIG. 2, the "channel page corresponding to the target live streaming entry identification" may be the page 201 in FIG. 2. As another example, when the target live streaming entry identification refers to the entry identification including the head portrait 1 and the user's nickname 1 corresponding to the control "Enter Channel" shown in the page 200 of FIG. 4, the "channel page corresponding to the target live streaming entry identification" may be the page 401 in FIG. 4. For another example, when the target live streaming entry identification refers to the entry identification including the head portrait 2 and the user's nickname 2 selected by the user as shown in the page 300 of FIG. 3, the "channel page corresponding to the target live streaming entry identification" may be the page 301 in FIG. 3.

It can be seen that, for the channel page corresponding to the target live streaming entry identification, in a possible implementation, the channel page may include a live streaming preview region (e.g., a region 207 in FIG. 2), a live streaming entry recommendation region (e.g., a region 208 in FIG. 2), and a recommended information flow presentation region (e.g., a region 209 in FIG. 2).

In order to better understand the above channel page, the related contents of the live streaming preview region, the live streaming entry recommendation region and the recommended information flow presentation region are described respectively in the following.

The related contents of the live streaming preview region are as follows.

The live streaming preview region is configured to play the live streaming preview information flow corresponding to the above target live streaming entry identification (e.g., the live streaming preview information flow shown in the region 207 in FIG. 2). The live streaming preview information flow may be configured to present some or all of the content in the live video data played corresponding to the target live streaming entry identification.

In fact, in order to better improve the user experience, the present disclosure further provides a possible implementation of the above live streaming preview region. In the implementation, when the live streaming preview information flow corresponding to the above target live streaming entry identification carries audio data, the information presentation process of the live streaming preview region may at least include the following steps. When presenting the channel page corresponding to the target live streaming entry identification, the live streaming preview information flow corresponding to the target live streaming entry identification is adjusted to a mute state, and an icon (for example, an icon 202 shown in FIG. 2) corresponding to the mute state is presented in the live streaming preview region, so that a user can subsequently adjust the live streaming preview information flow from the mute state to a sound-on state by means of some operations (for example, a click operation, etc.) for the icon. It can be seen that for the live streaming preview information flow displayed in the live streaming preview region, a sound needs to be manually turned on by the user, so as to avoid bothering the user by automatically turning on the audio data carried by the live streaming preview information flow, thereby facilitating the improvement of user experience.

It should be noted that when exiting and re-entering the above channel page, the live streaming preview information flow is in the mute state when re-entering the channel page, regardless of whether it is in the sound-on state when exiting.

In addition, the present disclosure does not define the above presentation content in the live streaming preview region, for example, in a possible implementation, the presentation content in the live streaming preview region may specifically include information such as the name of the live streaming room (for example, the name of "@ user's nickname 2" shown in the region 207 in FIG. 2), the state of the live streaming room (for example, the state of being in the live streaming), and the commodity card (for example, a commodity card 203 shown in the region 207 in FIG. 2) in the state of being in the explanation in the live streaming room. The commodity card is configured to describe relevant information of the commodity in the state of being in the explanation in the live streaming room. The present disclosure does not define the commodity card. For example, the commodity card may at least include contents such as a commodity image, a commodity title, a post-coupon resource value (e.g., an optimal post-coupon price), etc.

In fact, in order to reduce as much as possible the occlusion on the live streaming content by the above commodity card, the dynamic presentation may be made for the commodity card. Based on this, the present disclosure further provides a possible implementation of the above live streaming preview region. In the implementation, when the live streaming preview information flow further presents the object description information corresponding to the above target live streaming entry identification (for example, a commodity card in the state of being in explanation in the live streaming room, etc.), the information presentation process of the live streaming preview region may at least include the following steps. After presenting a channel page (e.g., a page 500 in FIG. 5) corresponding to the target live streaming entry identification, when a preset update condition is reached (e.g., the presenting duration of the channel page reaches 2 seconds), switching the object description information from a first information presentation state (e.g., the state of a commodity card 503 in FIG. 5) to a second information presentation state (e.g., the state of a commodity card 502 in FIG. 5) on the channel page. Thus, the region occupied by the object description information in the second information presentation state on the channel page is smaller than the region occupied by the object description information in the first information presentation state on the channel page, thereby effectively reducing the occlusion on the live streaming content by the object description information. The object description information is configured to describe relevant information (for example, information such as a commodity image, a commodity title, a commodity resource value, etc.) of a commodity in an in-explanation state in the live streaming room corresponding to the target live streaming entry identification. The preset update condition may be set in advance according to an application scenario. For example, the preset update condition is that the presentation time of the channel page reaches 2 seconds.

It can be seen that in some application scenarios, for the channel page including the above live streaming preview region, upon initially entering the channel page (e.g., the page 500 in FIG. 5), the object description information corresponding to the above target live streaming entry identification may be presented in the live streaming preview region by means of a big commodity card, which is narrowed down from top to bottom to a small commodity card (e.g., a commodity card 502 shown in the page 501 in FIG. 5) after determining that the presentation time of the channel page reaches 2 seconds, and kept as the small commodity card form at all times. This can effectively reduce the occlusion on the live streaming content by the object description information, thereby facilitating the improvement of the viewing experience of the live streaming content.

In addition, in order to better improve the user experience, when the object description information corresponding to the above target live streaming entry identification is presented as a commodity card, a close button may be deployed on the upper right side of the commodity card, so that the user can close the commodity card through the close button. Thus, the occlusion on the live streaming content by the object description information can be completely eliminated, thereby facilitating the improvement of the viewing experience of the live streaming content.

Indeed, to better improve the user experience, for the live streaming preview region above, the user may enter the live streaming room corresponding to the target live entry identification above by triggering some operations for the live streaming preview region. Based on this, the embodiments of the present disclosure further provide an interaction process of the live streaming preview region, which may specifically include: in response to a trigger operation for the live streaming preview region, presenting a live streaming presentation page corresponding to the target live streaming entry identification, in which the live streaming presentation page is configured to present live video data corresponding to the target live streaming entry identification (namely, a live streaming room corresponding to the target live streaming entry identification), thereby enabling the user to view the content explained in the live streaming room corresponding to the target live streaming entry identification on the live streaming presentation page. Here, the trigger operation may be preset. For example, it may refer to a pull-down operation triggered within the live streaming preview region or a click operation triggered for the live streaming preview information flow presented within the live streaming preview region.

It can be seen that in some application scenarios, with regard to the live streaming preview region for playing the live streaming preview information flow corresponding to the target live streaming entry identification, the user can access the live streaming room corresponding to the target live streaming entry identification by means of a pull-down operation triggered for the live streaming preview region or a click operation triggered for the live streaming preview information flow, so that the user can view the content explained in the live streaming room.

In fact, in order to better improve the user experience, for the above live streaming preview region, the user may trigger some operations for the commodity card presented within the live streaming preview region to directly enter the live streaming room corresponding to the above target live streaming entry identification to view the commodity detail page corresponding to the commodity card. Based on this, the embodiments of the present disclosure further provides an interaction process of the live streaming preview region. When the object description information (for example, a commodity card) corresponding to the target live streaming entry identification is presented on the live streaming preview information flow, the interaction process may specifically include: in response to the trigger operation for the object description information, presenting the live streaming presentation page corresponding to the target live streaming entry identification and presenting a commodity detail page corresponding to the object description information on the live streaming presentation page, so that the commodity detail page can represent relevant content of the commodity described by the object description information. The trigger operation may be preset. For example, it may be a click operation triggered for the object description information.

Figure 5:
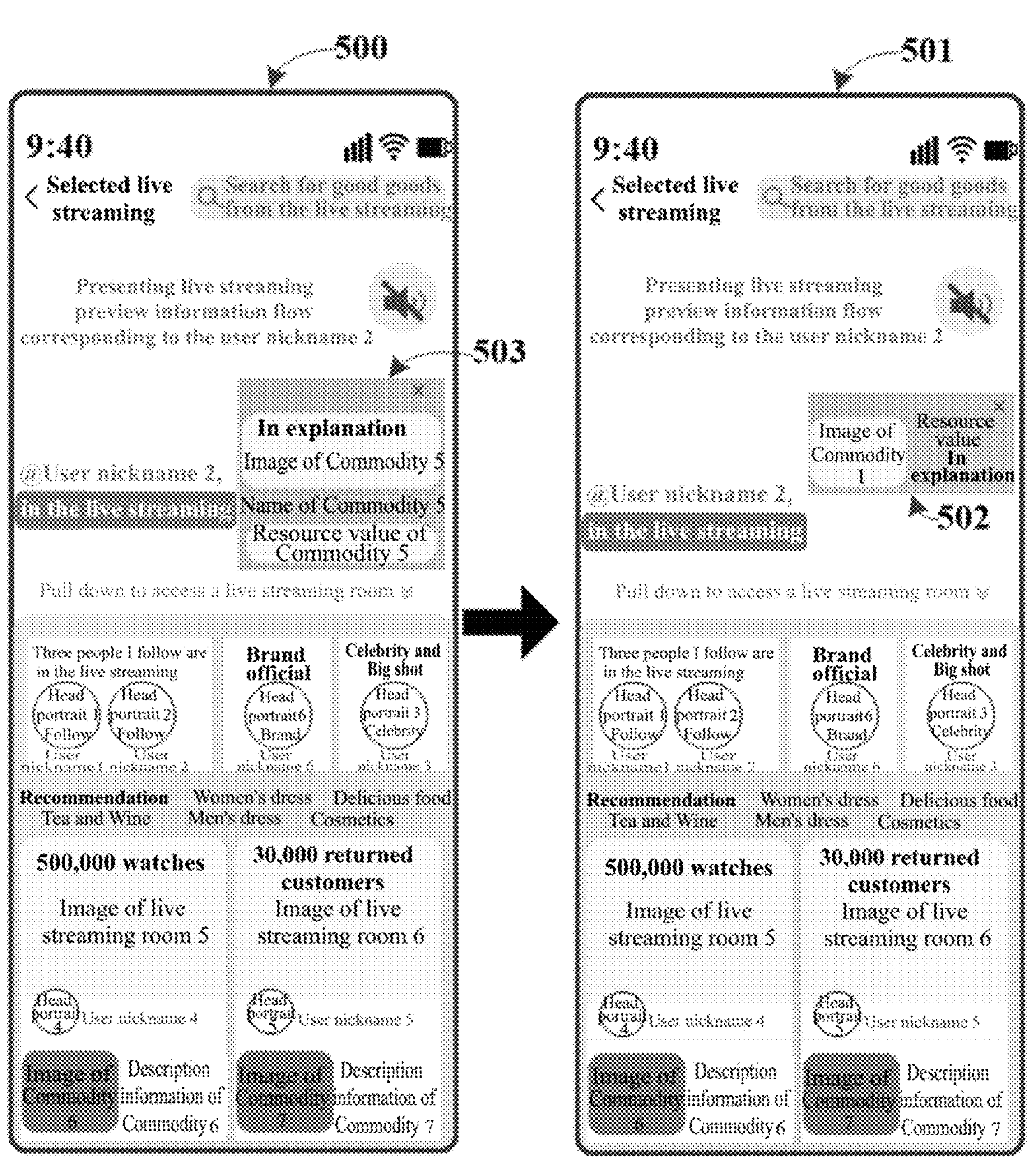
FIG. 5 is a schematic diagram of a dynamic change flow provided by an embodiment of the present disclosure.

It can be seen that in some application scenarios, with regard to the live streaming preview region for playing the live streaming preview information flow corresponding to the target live streaming entry identification, when the object description information (for example, a commodity card 503 or a commodity card 502 shown in FIG. 5) corresponding to the target live streaming entry identification is presented on the live streaming preview information flow, the user can access the live streaming room corresponding to the target live streaming entry identification by means of a click operation triggered for the object description information, and a commodity detail page corresponding to the object description information is automatically invoked so as to enable the user to better understand the commodity information. This is advantageous for improving the user experience.

In addition, the present disclosure does not limit the location of the live streaming preview region in the channel page. For example, in a possible implementation, the position of the live streaming preview region in the channel page is above the position of the live streaming entry recommendation region in the channel page, and the position of the live streaming entry recommendation region in the channel page is above the position of the recommended information flow presentation region in the channel page.

Furthermore, the present disclosure does not define the size of the above live streaming preview region. For example, in a possible implementation, the size of the live streaming preview region is equal to the sum of the size of the above live streaming entry recommendation region and the size of the above recommended information flow presentation region, so that the live streaming preview information flow corresponding to the above target live streaming entry identification can be presented in the manner of a half-screen live card.

Based on the above relevant contents of the live streaming preview region, it can be seen that in some application scenarios, the live streaming preview region may occupy the upper half-screen region of the channel page, so that the live streaming preview information flow displayed in the live streaming preview region for the target live streaming entry identification can be presented in the manner of the half-screen live card, and the user can subsequently access the live streaming room corresponding to the target live streaming entry identification through some operations triggered for the live streaming preview information flow.

The related contents of the live streaming entry recommendation region are as follows.

The live streaming entry recommendation region is configured to present recommended live streaming entry identifications (e.g., all entry identifications shown in the region 208 in FIG. 2), so that the user can subsequently enter to view other live related contents through the recommended live streaming entry identifications. In addition, the present disclosure does not define the number of the recommended live streaming entry identifications. For example, Q recommended live streaming entry identifications may be presented in the live streaming entry recommendation region. Here, Q is a positive integer, and Q may be predetermined. For example, as shown in the region 208 of FIG. 2, Q may be 4. It should be noted that the recommended live streaming entry identification is similar to the candidate live streaming entry identification above, and for the sake of brevity, the recommended live streaming entry identification will not be described in detail herein.

Indeed, to better improve the user experience, the above live streaming entry recommendation region may be used to recommend the live streaming under some categories with a higher probability of access (e.g., the category "My follow" shown in the region 204 of FIG. 2, the category "Brand Officials" shown in the region 205 of FIG. 2, the category "Celebrity and Big shot" shown in the region 206 of FIG. 2, etc.). Based on this, the present disclosure further provides a possible implementation of the live streaming entry recommendation region, in which the live streaming entry recommendation region is configured to present a recommended live streaming entry identification corresponding to at least one first category. Each of the at least one first category is different. The first category refers to a live streaming category with a relatively higher access probability that is predetermined. For example, the "at least one first category" may include three categories of "My follow", "Brand Officials", and "Celebrity and Big shot". In addition, the recommended live streaming entry identification corresponding to the $i^{th}$ first category is configured to uniquely identify the entry of the next one or more live streaming rooms of the $i^{th}$ first category. Furthermore, the number of recommended live streaming entry identifications corresponding to the $i^{th}$ first category may be preset (for example, the number of recommended live streaming entry identifications corresponding to the category of "My follow" is two; the number of recommended live streaming entry identifications corresponding to the category of "Brand Officials" is 1; and the number of recommended live streaming entry identifications corresponding to the category of "Celebrity and Big shot" is 1). The above i is a positive integer, $i \leq I$, I is a positive integer, and I represents the number of the first category.

It should be noted that, for the recommended live streaming entry identification corresponding to the category of "My follow", when all the live streaming rooms under the category of "My follow" are not opened, some recommended live streaming rooms may be determined using a preset recommendation strategy, and the entry identifications of the recommended live streaming rooms can be displayed in the tile region corresponding to the category of "My follow". Meanwhile, the title document of "No live streaming, Recommendations for You" can be displayed in the tile region. When there is at least one live streaming room in the live streaming rooms under the category of "My follow" is in the live streaming, but the number of live streaming rooms in the live streaming state is less than the number required to be displayed in the tile region corresponding to the category of "My follow", the entry identifications of all live streaming rooms in the category of "My follow" in the live streaming state and some recommended live streaming entry identifications may be displayed in the tile region corresponding to the category of "My follow", and the title document of "X people are in live streaming" is displayed in the tile region, and the X is the number of all live streaming rooms that start live streaming under the category of "My follow". When there is at least one live streaming room in the category of "My follow" is in the live streaming, and the number of live streaming rooms in the live streaming state is equal to or greater than the number required to be displayed in the tile region corresponding to the category of "My follow", some of the live streaming rooms may be selected from the live streaming rooms in live streaming, and the entry identifications of the selected live streaming rooms are displayed in the tile region corresponding to the category of "My follow", and the title document of "X people are in live streaming" is displayed in the tile region.

In fact, in order to better improve the user experience, when the above recommended live streaming entry identification includes a head portrait, some documents (e.g., "Follow", "Celebrity", etc.) may be added to the head portrait. Based on this, the present disclosure further provides in a possible implementation of the recommended live streaming entry identification corresponding to the $i^{th}$ first category above, which may specifically be as follows. When the $i^{th}$ first category is the category of "My follow", if the current user has followed the live streaming room characterized by the recommended live streaming entry identification corresponding to the $i^{th}$ first category, the document "follow" can be added to the head portrait in the recommended live streaming entry identification. If the current user does not follow the live streaming room characterized by the recommended live streaming entry identification corresponding to the $i^{th}$ first category, a document corresponding to the reason for the recommendation (for example, a document such as "you browsed") can be added to the head portrait in the recommended live streaming entry identification. When the $i^{th}$ first category is the category "Brand Officials", the document "Brand" may be added to the head portrait in the recommended live streaming entry identification corresponding to the $i^{th}$ first category. When the $i^{th}$ first category is the category "Celebrity and Big shot", the document "Celebrity" may be added to the head portrait in the recommended live streaming entry identification corresponding to the $i^{th}$ first category.

Indeed, in some application scenarios, the user may view relevant contents of some live streaming rooms through the above live streaming entry recommendation region. Based on this, the present disclosure further provides an interaction process of the live streaming entry recommendation region. When a recommended live streaming entry identification is presented in the live streaming entry recommendation region, the interaction process may specifically include: in response to a trigger operation for the recommended live streaming entry identification, presenting a live streaming aggregation page corresponding to the recommended live streaming entry identification, in which the live streaming aggregation page is configured to present a plurality of recommended live streaming information flows, and the plurality of recommended live streaming information flows include the live streaming information flow corresponding to the recommended live streaming entry identification. Here, the trigger operation may be preset. For example, it may be a click operation for a tile region corresponding to a certain first category or a click operation for a certain recommended live streaming entry identification corresponding to the first category. The recommended live streaming information flow refers to a live streaming information flow presented on the live streaming aggregation page, and the live streaming room corresponding to the recommended live streaming information flow also belongs to the first category corresponding to the recommended live streaming entry identification.

The above "live streaming aggregation page corresponding to the recommended live streaming entry identification" is configured for aggregating and presenting some live streaming information flows under the first category corresponding to the recommended live streaming entry identification. Furthermore, the present disclosure does not define the live streaming aggregation page. For example, in a possible implementation, when the live streaming aggregation page is used to present several of the above recommended live streaming information flows in a target ranking order, the live streaming information flow corresponding to the recommended live streaming entry identification is in the first place in the target ranking order. To facilitate understanding, three examples are described below.

Figure 6:
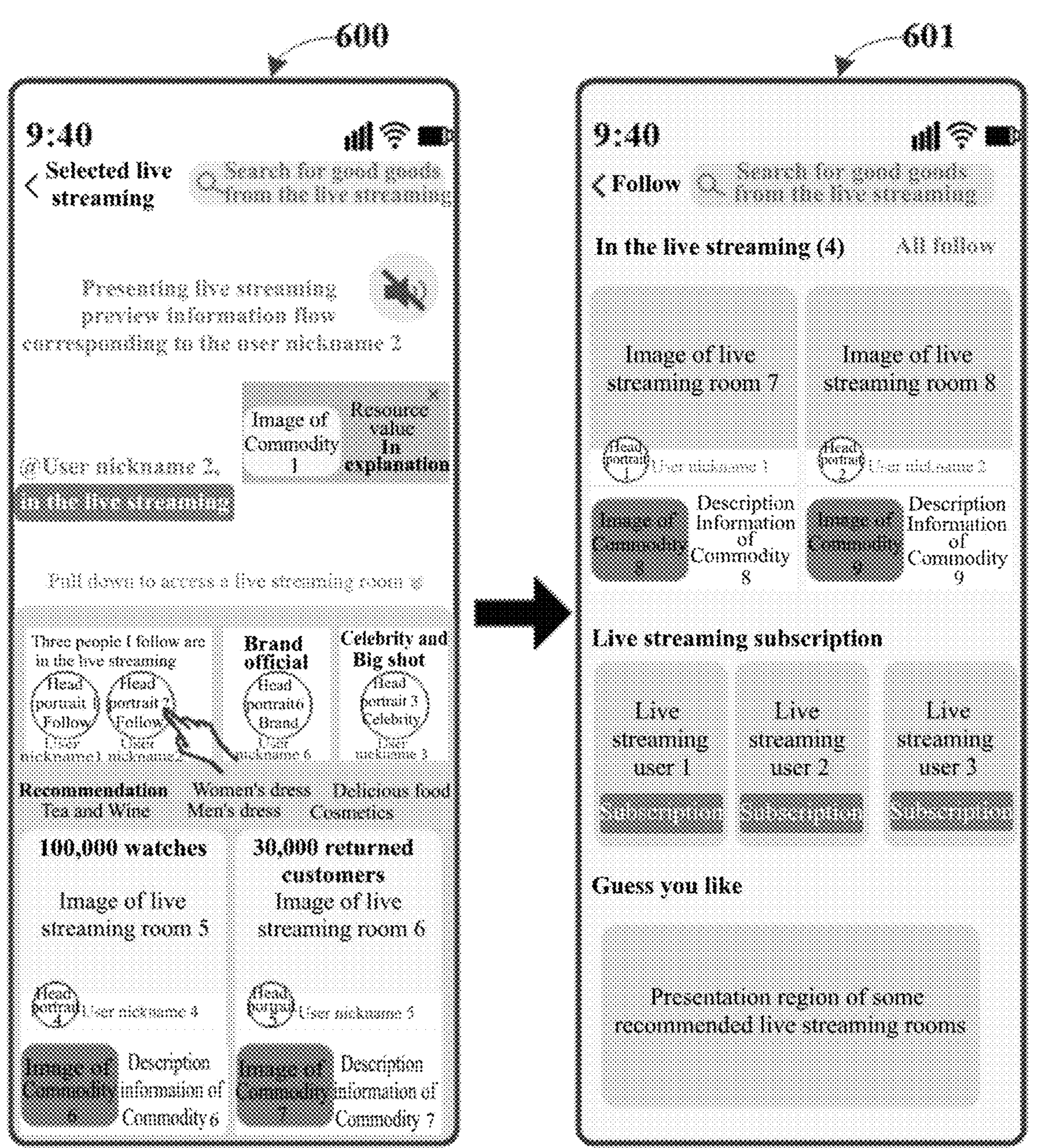
FIG. 6 is a schematic diagram of an interaction flow provided by an embodiment of the present disclosure.

Example 1, as shown in FIG. 6, when the recommended live streaming entry identification operated by the user is a entry identification in the category of "My follow" shown in the page 600 in FIG. 6, the "live streaming aggregation page corresponding to the recommended live streaming entry identification" may be the page 601 shown in FIG. 6, and the live streaming information flows corresponding to all the entry identifications in the category of "My follow" shown in the page 600 are at the top/in the first place in the page 601.

Figure 7:
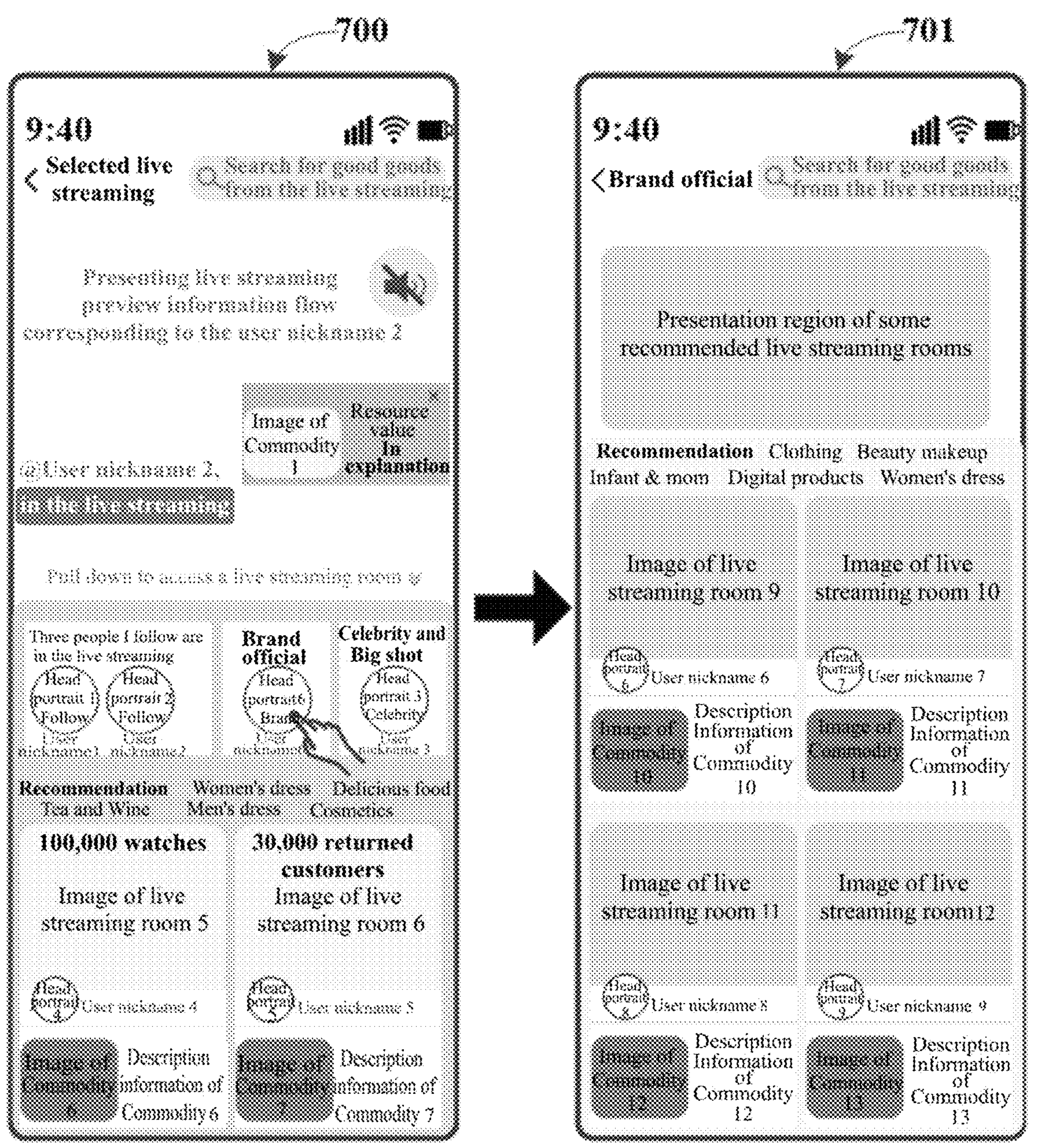
FIG. 7 is a schematic diagram of an interaction flow provided by an embodiment of the present disclosure.

Example 2, as shown in FIG. 7, when the recommended live streaming entry identification operated by the user is an entry identification in the category of "Brand Officials" shown in the page 700 in FIG. 7, the "live streaming aggregation page corresponding to the recommended live streaming entry identification" may be the page 701 shown in FIG. 7, and the live streaming information flows corresponding to all the entry identifications in the category of "Brand Officials" shown in the page 700 are at the top/in the first place in the page 701.

Figure 8:
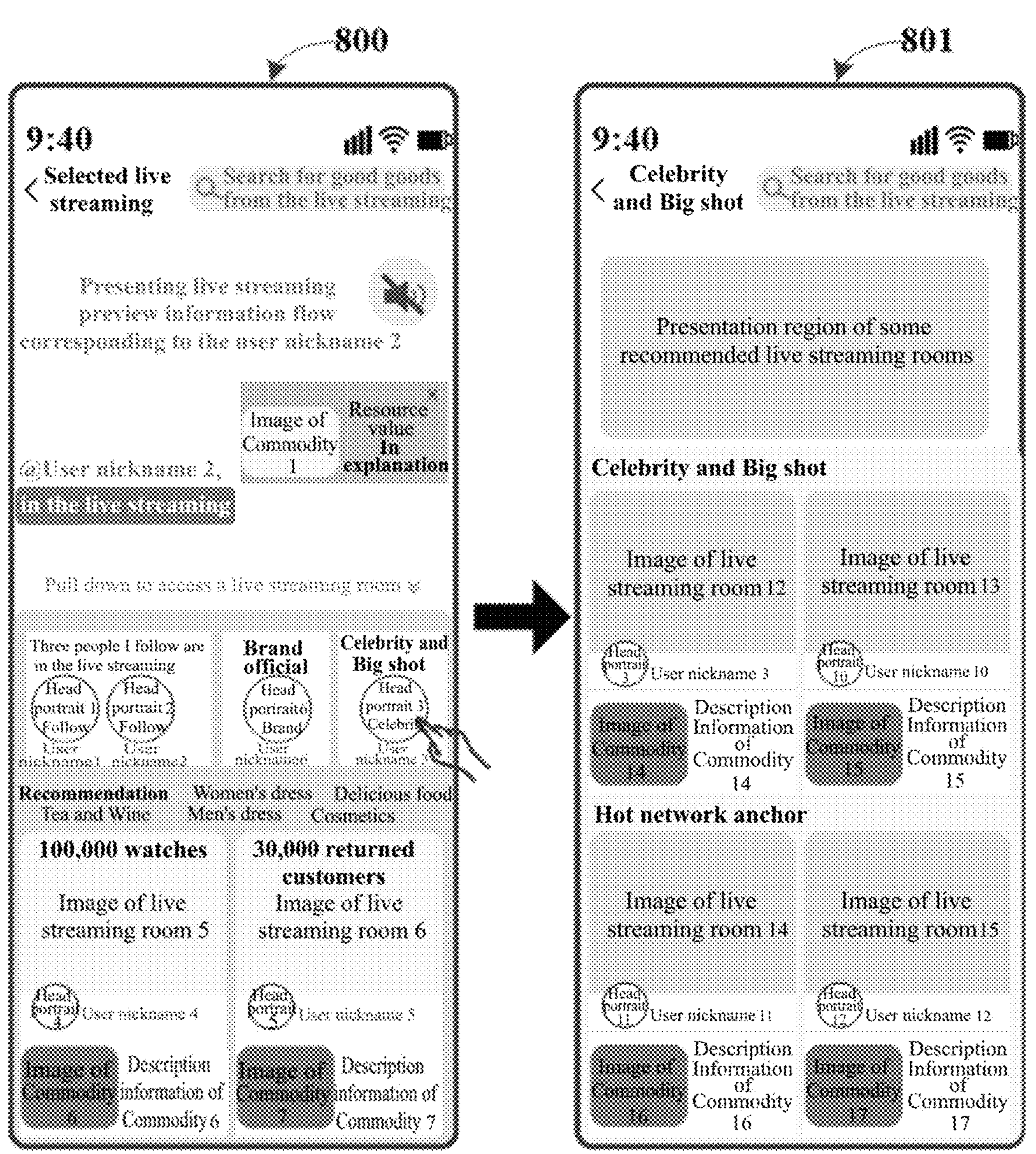
FIG. 8 is a schematic diagram of an interaction flow provided by an embodiment of the present disclosure.

Example 3, as shown in FIG. 8, when the recommended live streaming entry identification operated by the user is an entry identification in the category of "My follow" shown in the page 800 in FIG. 8, the "live streaming aggregation page corresponding to the recommended live streaming entry identification" may be the page 801 shown in FIG. 8, and the live streaming information flows corresponding to all the entry identifications in the category of "Celebrity and Big shot" shown in the page 800 are at the top/in the first place in the page 801. In addition, in order to better improve the user experience, the live streaming aggregation page corresponding to the category of "Celebrity and Big shot" may be used not only for displaying the live streaming information flows of some live streaming rooms under the category of "Celebrity and Big shot", but also for displaying live streaming information flows of some live streaming rooms under other categories (e.g., Hot network anchor) associated with the category of "Celebrity and Big shot", so as to improve the user experience.

In fact, with regard to the above "live streaming aggregation page corresponding to the recommended live streaming entry identification", the user can access the live streaming room corresponding to the live streaming information flow by some operations triggered for any one of the live streaming information flows presented in the live streaming aggregation page. Based on this, the present disclosure further provides an interaction process for the live streaming aggregation page. When the live streaming aggregation page presents a plurality of recommended live streaming information flows, the interaction process may specifically include: in response to a trigger operation (e.g., a click operation) for a target live streaming information flow in the plurality of recommended live streaming information flows, presenting a live streaming presentation page corresponding to the target live streaming information flow, in which the live streaming presentation page is configured to present live video data corresponding to the target live streaming information flow (i.e., the live streaming room corresponding to the target live streaming information flow), thereby enabling the user to view the content explained in the live streaming room corresponding to the target live streaming information flow on the live streaming presentation page. Here, the target live streaming information flow refers to a recommended live streaming information flow which is triggered for operation.

Based on the above relevant contents of the live streaming entry recommendation region, in some application scenarios, the live streaming entry recommendation region may present some live streaming entry identifications under a category with a relatively higher access probability through some tile regions, so that the user can subsequently enter a secondary page corresponding to the category (for example, the page 601 shown in FIG. 6, the page 701 shown in FIG. 7 and the page 801 shown in FIG. 8) through the live streaming entry identifications, thereby enabling the user to select to enter some live streaming rooms from the secondary page.

The relevant contents of the recommended information flow presentation region are as follows.

The recommended information flow presentation region is configured to present a candidate live streaming information flow (e.g., each of the live streaming information flows shown in the region 209 in FIG. 2) so that the user can subsequently enter to view the relevant contents of other live streams through the candidate live streaming information flow. Here, the candidate live streaming information flow is configured to present the relevant content of a live streaming room. Moreover, the present disclosure does not limit the presentation of the candidate live streaming information flow, which may be presented, for example, by means of an information flow card (e.g., the information flow card shown in the region 209 of FIG. 2).

It should be noted that, for the information flow card shown in the region 209 in FIG. 2, the information flow card may include a live streaming room description picture, a commodity card, a live streaming account identification, and live streaming room advantage description information (e.g., an association relationship between a live streaming room and a user, a recommendation reason for a live streaming room, live streaming room state description information, etc.). In addition, the presenting position of the commodity card in the information flow card is higher than the presenting position of the live streaming account identification in the information flow card, and the presenting position of the live streaming account identification in the information flow card is higher than the presenting position of the commodity card in the information flow card. In addition, the present disclosure does not define the association relationship (e.g., recently bought, recently appreciated, your follow, etc.). The present disclosure does not define the recommendation reason (for example, the reasons such as the sales volume of a certain commodity in the live streaming room reaching the $Y^{th}$ place, the good evaluation rate reaching the $Z^{th}$ place, the re-purchase rate reaching the $H^{th}$ place and the hot sale reaching F pieces). The present disclosure does not define the live streaming room state description information, for example, it may be T people watching the live streaming room or in the live streaming. Here, Y, Z, H, F and T are all positive integers. In addition, the presentation priority of the association relationship is higher than the presentation priority of the recommendation reason of the live streaming room, and the presentation priority of the recommendation reason of the live streaming room is higher than the presentation priority of the live streaming room state description information.

In addition, in order to better improve the user experience, when a plurality of candidate live streaming information flows are presented in the recommended information flow presentation region, the candidate live streaming information flows may be presented in a two-column manner in the recommended information flow presentation region.

In addition, in order to better improve the user experience, the present disclosure further provides a possible implementation of the above recommended information flow presentation region, in the implementation, when the above live streaming entry aggregation interface presents a plurality of candidate live streaming entry identifications, and the plurality of candidate live streaming entry identifications include a target live streaming entry identification. For a channel page corresponding to the target live streaming entry identification, the recommended information flow presentation region in the channel page may be configured to present the plurality of candidate live streaming information flows, and the plurality of candidate live streaming information flows may include live streaming information flows corresponding to other candidate live streaming entry identifications in the plurality of candidate live streaming entry identifications except for the target live streaming entry identification. In addition, in some possible implementations, the live streaming information flows corresponding to the other candidate live streaming entry identifications are in a relatively front presentation position in the recommended information flow presentation region.

It can be seen that, in some application scenarios, when the live streaming entry aggregation interface presents a plurality of candidate live streaming entry identifications, and the plurality of candidate live streaming entry identifications include a target live streaming entry identification. For a channel page corresponding to the target live streaming entry identification, the channel page may not only display a live streaming preview information flow corresponding to the target live streaming entry identification through a live streaming preview region, but also display live streaming information flows corresponding to other candidate live streaming entry identifications in the plurality of candidate live streaming entry identifications except for the target live streaming entry identification through the recommended information flow presentation region. Thus, the user can view live streaming related contents of all the candidate live streaming entry identifications from the channel page.

In fact, in order to better improve the user experience, the present disclosure further provides a possible implementation of the above recommended information flow presentation region, in which the recommended information flow presentation region is configured to present a candidate live streaming information flow corresponding to at least one second category. Each of the at least one second category is different. Here, the second category can be set in advance according to an application scenario. For example, the "at least one second category" may include categories such as "Recommendation", "Women's dress", etc. shown in the region 209 of FIG. 2.

In addition, with regard to the above recommended information flow presentation region, when the recommended information flow presentation region is configured to present a candidate live streaming information flow corresponding to at least one second category, category labels of the second categories are also presented in the recommended information flow presentation region, so that the user can subsequently view the second categories by means of a sliding operation for the recommended information flow presentation region.

In fact, in order to better improve the user experience, the user may enter a corresponding live streaming room by some operations triggered for a certain candidate live streaming information flow in the above recommended information flow presentation region. Based on this, the present disclosure further provides an interaction process of the above recommended information flow presentation region, which can be specifically as follows. In response to a trigger operation (e.g., a click operation, etc.) for the candidate live streaming information flow, presenting a live streaming presentation page corresponding to the candidate live streaming information flow, in which the live streaming presentation page is configured to present live video data corresponding to the candidate live streaming information flow (i.e., a live streaming room corresponding to the target live streaming entry identification), thereby enabling the user to view the content explained in the live streaming room corresponding to the candidate live streaming information flow on the live streaming presentation page.

Based on the above relevant contents of the recommended information flow presentation region, it can be seen that in some application scenarios, the recommended information flow presentation region can display the live streaming information flows corresponding to live streaming rooms of some categories in a double-column manner, so that the user can subsequently enter the corresponding live streaming rooms for viewing through the live streaming information flows.

Based on the above relevant contents of S1 to S2, it can be seen that for the information presentation method provided by the embodiments of the present disclosure, when a live streaming entry aggregation interface (for example, a top page of the shopping mall) is being presented on an electronic device, and a plurality of candidate live streaming entry identifications (for example, live streaming account identifications, etc.) are presented on the live streaming entry aggregation interface, when the electronic device receives a trigger operation (for example, an operation of clicking a certain candidate live streaming entry identification, etc.) for the live streaming entry aggregation interface, the electronic device determines a target live streaming entry identification from the candidate live streaming entry identifications and present a channel page corresponding to the target live streaming entry identification (e.g., a selected live streaming page, etc.). The channel page includes a live streaming preview region, a live streaming entry recommendation region, and a recommended information flow presentation region, the live streaming preview region is configured to play a live streaming preview information flow corresponding to the target live streaming entry identification, the live streaming entry recommendation region is configured to present a recommended live streaming entry identification (e.g., an account identification of a live streaming room recommended under the categories of My follow, Brand Officials, Celebrity and Big shot, etc.), and the recommended information flow presentation region is configured to presenta candidate live streaming information flow (e.g., a live streaming information flow of a live streaming room recommended under the categories of recommendation, women's dress, clothing, etc.).

It can be seen that with regard to the above channel page, the channel page not only presents the live streaming preview information flow corresponding to the target live streaming entry identification, but also presents some recommended live streaming entry identifications and some candidate live streaming information flows, so that the user can not only directly access a live streaming room identified by the target live streaming entry identification for viewing through the live streaming preview information flow, but also can enter other live streaming rooms for viewing through the recommended live streaming entry identifications and the candidate live streaming information flows. Therefore, the live viewing experience of the user can be better satisfied, and the user experience can be effectively improved.

In addition, the embodiments of the present disclosure do not limit the execution main body of the information presentation method provided by the embodiments of the present disclosure. For example, the information presentation method provided by the embodiments of the present disclosure can be applied to a terminal device. As another example, the information presentation method provided by the embodiments of the present disclosure can also be implemented through a data interaction process between a terminal device and a server. The terminal device may be a smart phone, a computer, a personal digital assistant (PDA), a tablet computer, etc. The server may be a standalone server, a clustered server, or a cloud server.

In fact, in order to better improve the user experience, the present disclosure further provides another possible embodiment of the above information presentation method, in which the method includes not only the above S1-S2 but also the below step 11, or step 11-step 12, or step 11-step 13. Here, the execution time of step 11 is later than the execution time of S2.

Step 11: in response to a preset operation triggered for the channel page, adjusting the live streaming preview region from a triggerable presentation state to a non-triggerable presentation state, adjusting the live streaming entry recommendation region from a first presentation position to a second presentation position, and adjusting the recommended information flow presentation region from a first presentation region to a second presentation region; in which the second presentation position is higher than the first presentation position on the channel page; and space occupied by the second presentation region on the channel page is greater than space occupied by the first presentation region on the channel page.

The above "preset operation triggered for the channel page" can be set in advance according to an application scenario. For example, it may be an up-slide operation triggered for the channel page (for example, an up-slide operation triggered in the live streaming preview region in the channel page).

The above "triggerable presentation state" refers to a presentation state of the live streaming preview region, such that the live streaming preview region in the triggerable presentation state can respond to some operations triggered by the user (e.g., clicking on a commodity card, clicking on a live streaming preview information flow, etc.). For example, the triggerable presentation state may refer to the state of the live streaming preview region of the page 900 in FIG. 9.

The above "non-triggerable presentation state" refers to another presentation state of the live streaming preview region, such that the live streaming preview region in the non-triggerable presentation state cannot respond to any operation triggered by the user. It can be seen that the "non-triggerable presentation state" is in contrast to the "triggerable presentation state" above. For example, the non-triggerable presentation state may refer to the state of the live streaming preview region of the page 901 in FIG. 9. In addition, the present disclosure does not define the implementation of the "non-triggerable presentation state". For example, it may specifically be as follows. A translucent floating layer is added on top of the live streaming preview region to enable the translucent floating layer to insulate user-triggered operations for the live streaming preview region.

The above "first presentation position" refers to the position where the above live streaming entry recommendation region is originally presented on the above channel page. For example, the first presentation position may refer to the position, in the page 900, of the live streaming entry recommendation region of the page 900 in FIG. 9.

The above "second presentation position" refers to the position of the above live streaming entry recommendation region after one upward adjustment on the above channel page, so that the second presentation position on the channel page is higher than the above first presentation position. For example, the second presentation position may refer to the position, in the page 900, of the live streaming entry recommendation region of the page 901 in FIG. 9.

The above "first presentation region" refers to the region occupied by the above recommended information flow presentation region when initially presented on the above channel page. For example, the first presentation region may refer to the recommended information flow presentation region of the page 900 in FIG. 9.

The above "second presentation region" refers to the region occupied by the above recommended information flow presentation region after a region expansion adjustment on the above channel page, such that the second presentation region occupies more space on the channel page than the first presentation region on the channel page. For example, the second presentation region may refer to the recommended information flow presentation region of the page 901 in FIG. 9.

In fact, in order to better improve the user experience, the present disclosure further provides a possible implementation of the above step 11. In this implementation, when preset prompt information (for example, the prompt information of "pull down to access a live streaming room") is also displayed in the above channel page, the step 11 may specifically be as follows. In response to a preset operation triggered for a channel page, adjusting the live streaming preview region from a triggerable presentation state to a non-triggerable presentation state, adjusting the live streaming entry recommendation region from a first presentation position to a second presentation position, adjusting the recommended information flow presentation region from a first presentation region to a second presentation region, adjusting the preset prompt information from a fourth presentation position to a fifth presentation position, and switching the preset prompt information to prompt information corresponding to the above target live streaming entry identification.

The above "preset prompt information" is configured to prompt how to access a live streaming room corresponding to a live streaming preview information flow displayed in the above live streaming preview region. For example, the preset prompt information may specifically be a character string of "pull down to access a live streaming room".

The above "fourth presentation position" refers to a position where the above preset prompt information is initially displayed on the above channel page. For example, the fourth presentation position may refer to a position of the character string "pull down to access a live room" in the page 900 in FIG. 9.

The above "fifth presentation position" refers to a position where the above preset prompt information is located after one upward adjustment on the above channel page, so that the fifth presentation position is higher than the fourth presentation position on the channel page. For example, the fifth presentation position may refer to a position in the page 901 where the character string "pull down to access a live streaming room with the user nickname 2" is located in the page 901 of FIG. 9.

The above "prompt information corresponding to the target live streaming entry identification" is configured to describe an access operation on a live streaming presentation page corresponding to the target live streaming entry identification. Furthermore, the "prompt information corresponding to the target live streaming entry identification" is composed of the above preset prompt information and the name identification (e.g., a user nickname, etc.) of the live streaming account corresponding to the target live streaming entry identification. For example, the "prompt information corresponding to the target live streaming entry identification" may be the character string "pull down to access a live streaming room with the user nickname 2" shown in FIG. 9.

Figure 9:
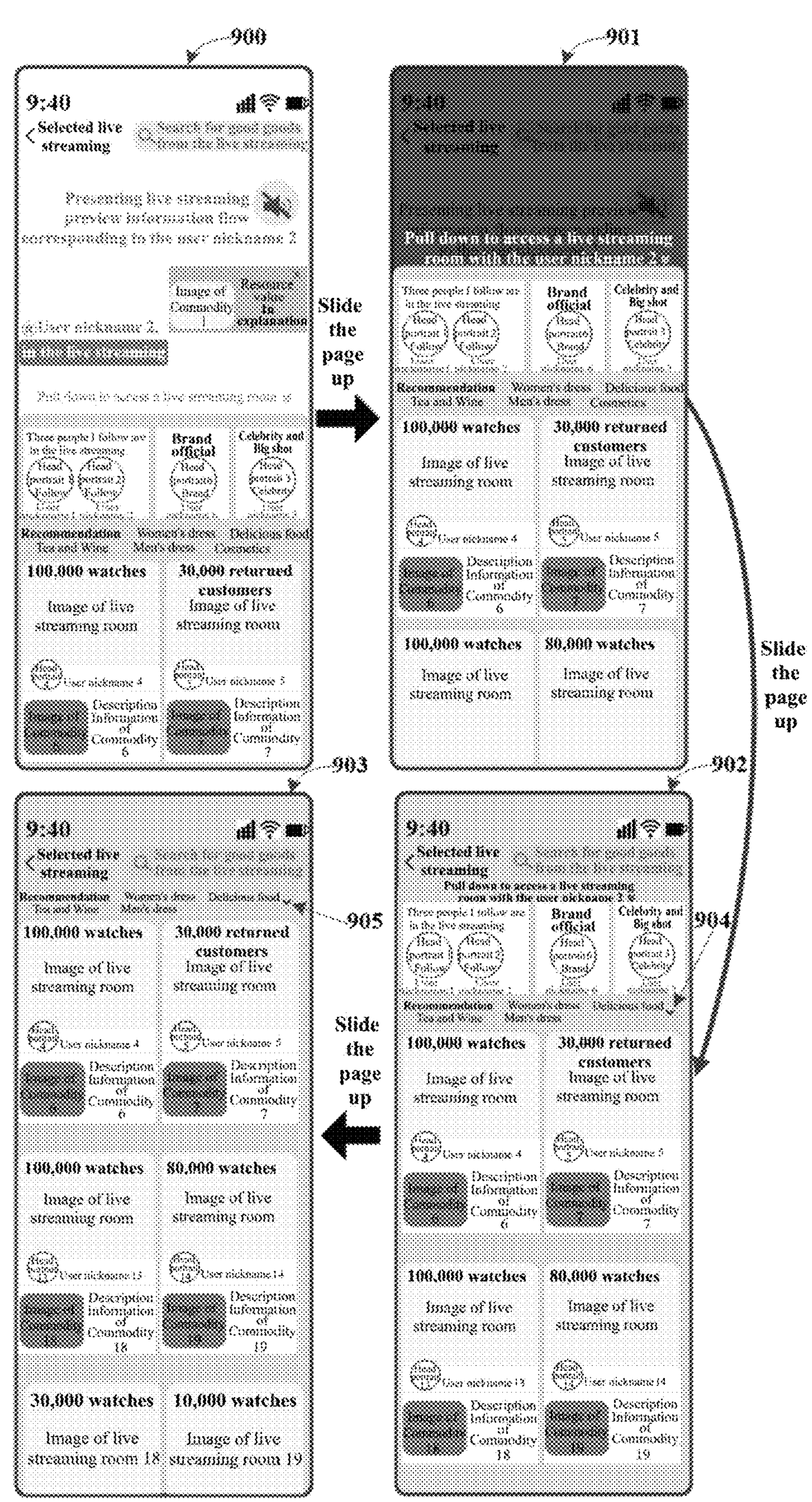
FIG. 9 is a schematic diagram of an interaction flow provided by an embodiment of the present disclosure.

Based on the relevant contents of step 11 above, it can be seen that with regard to an electronic device, when a channel page (for example, the page 900 in FIG. 9) corresponding to the above target live streaming entry identification is being presented on the electronic device, and a pull-down prompt text is presented on the channel page, after the electronic device receives a preset operation triggered for the channel page (for example, an upward sliding operation, etc.), the live streaming preview region is adjusted to a non-triggerable presentation state (for example, a black semi-transparent floating layer is added as shown in the page 901 in FIG. 9). The position of the live streaming entry recommendation region on the channel page is adjusted to be higher, and the occupation region of the recommended information flow presentation region on the channel page adjusted to be increased, the position of the pull-down prompt text on the channel page is also adjusted to be higher and the pull-down prompt text is adjusted from the preset prompt information to the prompt information corresponding to the above target live streaming entry identification, so as to obtain a channel page similar to that shown in the page 901 in FIG. 9.

Step 12: in response to a preset operation triggered for the channel page, canceling the presenting of the live streaming preview region, adjusting the live streaming entry recommendation region from the second presentation position to a third presentation position, and adjusting the recommended information flow presentation region from the second presentation region to a third presentation region; in which the third presentation position is higher than the second presentation position on the channel page; and space occupied by the third presentation region on the channel page is greater than space occupied by the second presentation region occupies on the channel page.

The relevant contents of the preset operation can be seen in the relevant contents of the step 11 above.

The above "third presentation position" refers to the position of the above live streaming entry recommendation region after two upward adjustments on the above channel page, so that the third presentation position is higher than the above second presentation position on the channel page. For example, the second presentation position may refer to the position in the page 902 of the live streaming entry recommendation region of the page 902 in FIG. 9.

The above "third presentation region" refers to the region occupied by the above recommended information flow presentation region after two region expansion adjustments on the above channel page, such that space occupied by the third presentation region on the channel page is greater than space occupied by the second presentation region on the channel page. For example, the third presentation region may refer to the recommended information flow presentation region of the page 902 in FIG. 9.

In fact, in order to better improve the user experience, the present disclosure further provides a possible implementation of the above step 12. In this implementation, when the prompt information corresponding to the above target live streaming entry identification is also presented on the above channel page (for example, the prompt information of "pull down to access a live streaming room with a user nickname 2"), the step 12 may specifically be as follows. In response to a preset operation triggered for the channel page, canceling the presenting of the live streaming preview region, adjusting the live streaming entry recommendation region from the second presentation position to a third presentation position, adjusting the recommended information flow presentation region from the second presentation region to a third presentation region, adjusting the prompt information from a fifth presentation position to a sixth presentation position, and adjusting the prompt information from a first color to a second color. Here, the second color is different from the first color, and the first color is opposite to the second color. For example, when the first color is white, the second color is black.

The above "sixth presentation position" refers to the position where the prompt information corresponding to the above target live streaming entry identification is located after being adjusted upwards on the above channel page, so that the sixth presentation position on the channel page is higher than the above fifth presentation position. For example, the sixth presentation position may refer to the position in the page 902 where the character string "pull down to access a live streaming room with the user nickname 2" of the page 902 in FIG. 9 is located.

In fact, in order to better improve the user experience, the present disclosure further provides a possible implementation of the above step 12, in the implementation, when a plurality of candidate category labels are presented in the above recommendation information flow presentation region, the step 12 may specifically be as follows. In response to a preset operation triggered for the channel page, canceling the presenting of the live streaming preview region, adjusting the live streaming entry recommendation region from the second presentation position to a third presentation position, adjusting the recommended information flow presentation region from the second presentation region to a third presentation region, switching the plurality of candidate category labels from a first aggregated presentation state (e.g., an aggregated state of the plurality of labels in the recommended information flow presentation region of the page 901 in FIG. 9) to a second aggregated presentation state (e.g., an aggregated state of the plurality of labels in the recommended information flow presentation region of the page 902 in FIG. 9). The candidate category label refers to a category label displayed in the recommended information flow presentation region. The plurality of candidate category labels in the first aggregated presentation state are used for displaying in sequence in response to a preset sliding operation. The plurality of candidate category labels in the second aggregated presentation state are used for displaying in response to a control to be used corresponding to the second aggregated presentation state. The control to be used is used to trigger a presentation flow for a page obtained by aggregating a large number of category labels. For example, the control to be used may be implemented using the control 904 or the control 905 in FIG. 9.

It can be seen that, on the basis of the above relevant contents of the step 12, for an electronic device, when a channel page (for example, the page 901 in FIG. 9) corresponding to the above target live streaming entry identification is being displayed on the electronic device, the channel page has undergone an adjustment processing procedures triggered by a preset operation, and the channel page presents a pull-down prompt text, after the electronic device receives a preset operation triggered for the channel page again, the presenting of the live streaming preview region is directly canceled, and the position of the live streaming entry recommendation region on the channel page continues to be raised, the region occupied by the recommended information flow presentation region on the channel page continues to be enlarged, the position of the pull-down prompt text on the channel page also continues to be raised, the pull-down prompt text is changed from one color to another color, and a large number of category labels in the recommended information flow presentation region are adjusted to the second aggregated presentation state in which all category labels can be presented through the control to be used, to obtain a channel page similar to that shown in the page 902 of FIG. 9.

Step 13: in response to a preset operation triggered for the channel page, canceling the presenting of the live streaming entry recommendation region, adjusting the recommended information flow presentation region from the third presentation region to a fourth presentation region; in which space occipied by the fourth presentation region on the channel page is greater than space occipied by the third presentation region on the channel page.

The fourth presentation region refers to the region occupied by the above recommended information flow presentation region on the above channel page after three regional expansion adjustments, so that the space occupied by the fourth presentation region on the channel page is greater than the space occupied by the third presentation region on the channel page. For example, the fourth presentation region may refer to the recommended information flow presentation region of the page 903 in FIG. 9.

In fact, in order to better improve the user experience, the present disclosure further provides a possible implementation of the above step 13. In this implementation, when the prompt information corresponding to the above target live streaming entry identification is also displayed on the channel page (for example, the prompt information of "pull down to access a live streaming room with a user nickname 2"), the step 13 may specifically be as follows. In response to a preset operation triggered for a channel page, canceling the presenting of the live streaming preview region, canceling the prompt information corresponding to the target live streaming entry identification, and adjusting the recommended information flow presentation region from the third presentation region to a fourth presentation region.

It can be seen that on the basis of the above relevant contents of the step 13, for an electronic device, when a channel page (for example, the page 902 in FIG. 9) corresponding to the above target live streaming entry identification is being displayed on the electronic device, the channel page has undergone two adjustment processing procedures triggered by a preset operation, and when a pull-down prompt text is displayed on the channel page, after the electronic device receives the preset operation triggered for the channel page again, the presenting of the live streaming entry recommendation region and the pull-down prompt text is directly canceled. The region occupied by the recommended information flow presentation region on the channel page is continuously enlarged, to obtain a channel page similar to that shown in the page 903 of FIG. 9.

Based on the relevant contents of the steps 11-13 above, it can be seen that with regard to the above channel page, when an up-slide operation is triggered for the channel page, the channel page can present a three-stage page change process, so as to enable the user to better meet his live viewing requirements through the page change processes of the three pages.

In fact, for the above "prompt information corresponding to the target live streaming entry identification", the user can directly access the live streaming room corresponding to the target live streaming entry identification according to the operation described by the prompt information. Based on this, the present disclosure further provides another possible implementation of the above information presentation method, in which the information presentation method may further include the step 14 below. The execution time of the step 14 is later than the execution time of the step 11 above or later than the execution time of the step 12 above.

Step 14: when the above channel page is presenting prompt information corresponding to the target live streaming entry identification, and the prompt information is used to describe an access operation for the live streaming presentation page corresponding to the target live streaming entry identification, in response to the access operation, presenting the live streaming presentation page corresponding to the target live streaming entry identification. The access operation refers to a pull-down operation.

It can be seen that, for an electronic device, when a channel page (e.g., the page 901 or the page 902 in FIG. 9) corresponding to the above target live streaming entry identification is being presented on the electronic device, and the prompt information corresponding to the target live streaming entry identification is being presented on the channel page, after the electronic device receives an access operation described by the prompt information, the electronic device directly presents the live video data (i.e., a live streaming room corresponding to the target live streaming entry identification) corresponding to the target live streaming entry identification, so that the user can view the content explained in the live streaming room corresponding to the target live streaming entry identification on the live streaming presentation page.

Indeed, in order to better improve the user experience, the present disclosure further provides another possible implementation of the above information presentation method, in which the information presentation method may further include the step 15 below. The execution time of the step 15 is later than the execution time of the step 12 above or later than the execution time of the step 13 above.

Step 15: when the above recommended information flow presentation region presents the plurality of candidate category labels according to the second aggregated presentation state, in response to a trigger operation for a control to be used corresponding to the second aggregated presentation state, presenting a category aggregation presentation page, in which the category aggregation presentation page presents the plurality of recommended category labels, and the plurality of recommended category labels include the plurality of candidate category labels.

Figure 10:
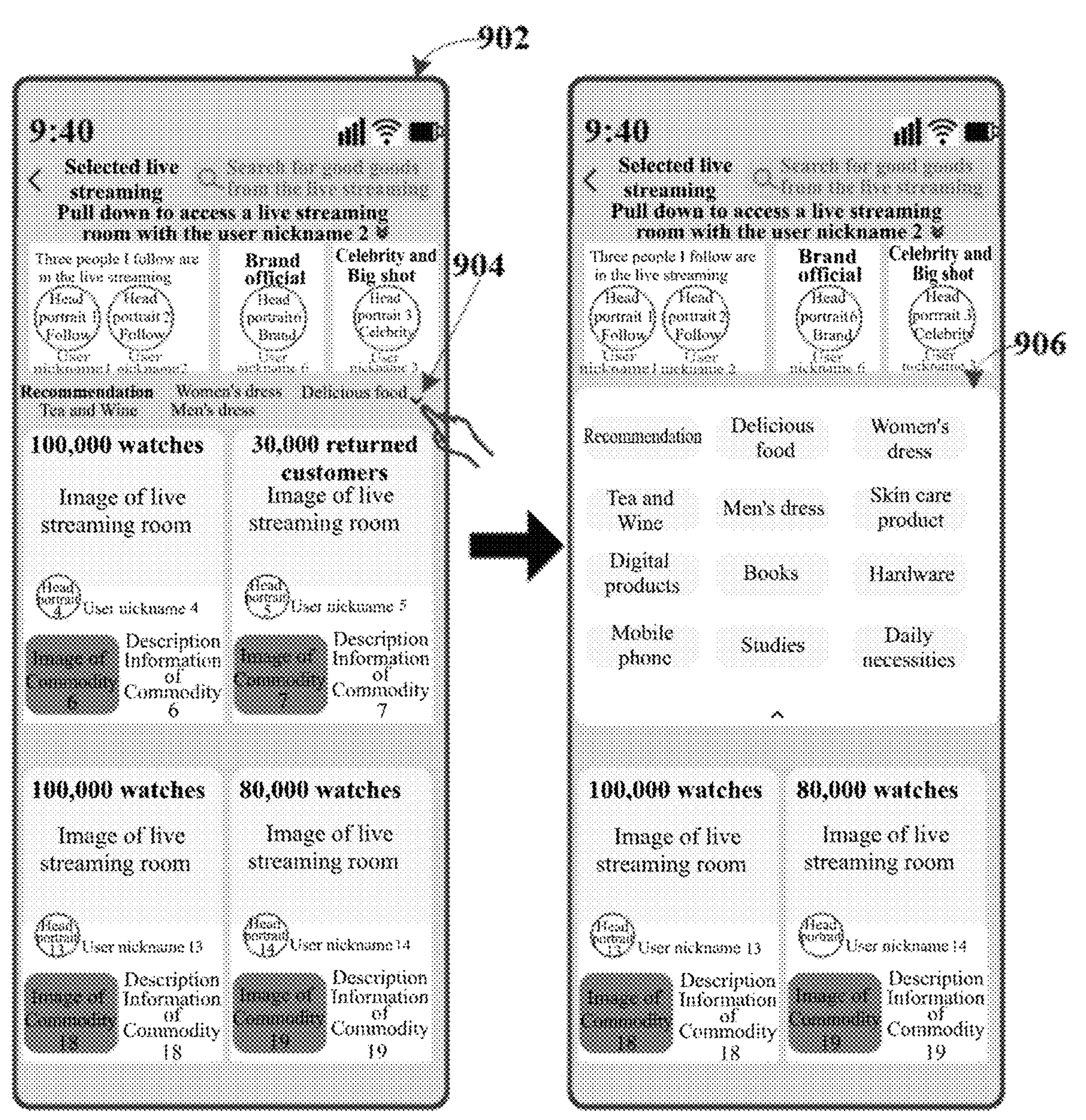
FIG. 10 is a schematic diagram of an interaction flow provided by an embodiment of the present disclosure.

The category aggregation presentation page is configured to aggregate and present all the category labels corresponding to the above recommended information flow presentation region. For example, the category aggregation presentation page may be the page 906 in FIG. 10.

The recommended category label refers to the category label presented in the above category aggregation presentation page.

Based on the above relevant contents of the step 15, it can be seen that for an electronic device, when a channel page (for example, the page 902 or the page 903 in FIG. 9) corresponding to the above target live streaming entry identification is being presented on the electronic device, and a plurality of candidate category labels are being presented according to the second aggregated presentation state in the recommended information flow presentation region of the channel page, after the electronic device receives a trigger operation (for example, a click operation for the control 904 or the control 905 in FIG. 9) for a control to be used corresponding to the second aggregated presentation state, a category aggregation presentation page is presented, so that all recommended category labels can be presented in the category aggregation presentation page, and all recommended category labels include the plurality of candidate category labels, so that the user can subsequently select the category to which they want to view the live streaming through the recommended category labels, thus improving the user experience.

Figure 11:
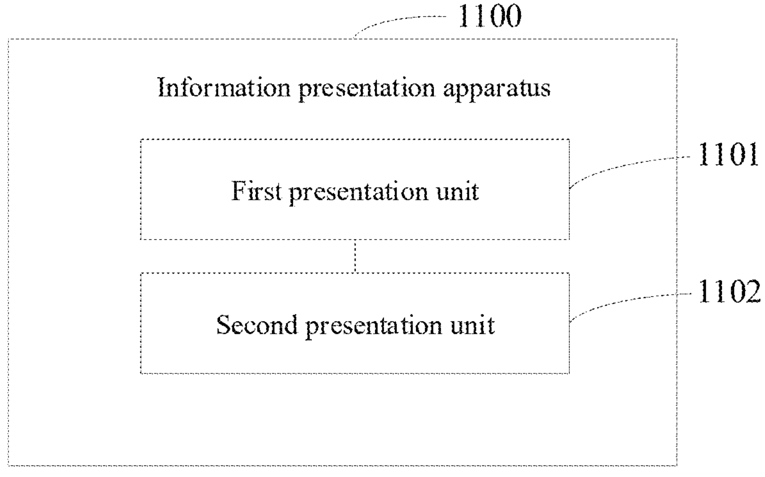
FIG. 11 is a structural schematic diagram of an information presentation apparatus provided by an embodiment of the present disclosure.

The embodiments of the present invention further provide an information presentation apparatus based on the information presentation method provided by the embodiments of the present invention, which will be described and illustrated with reference to FIG. 11. FIG. 11 is a structural schematic diagram of an information presentation apparatus provided by an embodiment of the present disclosure. It should be noted that the technical details of the information presentation apparatus provided by the embodiments of the present disclosure can be referred to the related contents of the above information presentation method.

As shown in FIG. 11, the information presentation apparatus 1100 provided by the embodiments of the present disclosure includes:

- a first presentation unit 1101, configured to present a live streaming entry aggregation interface, in which the live streaming entry aggregation interface presents a plurality of candidate live streaming entry identifications;
- a second presentation unit 1102, configured to, in response to a trigger operation for the live streaming entry aggregation interface, determine a target live streaming entry identification from the plurality of candidate live streaming entry identifications, and present a channel page corresponding to the target live streaming entry identification; in which the channel page includes a live streaming preview region, a live streaming entry recommendation region and a recommended information flow presentation region; the live streaming preview region is configured to play a live streaming preview information flow corresponding to the target live streaming entry identification; the live streaming entry recommendation region is configured to present a recommended live streaming entry identification; and the recommended information flow presentation region is configured to present a candidate live streaming information flow.

In a possible implementation, the information presentation apparatus 1100 further includes:

a third presentation unit, configured to, in response to a trigger operation for the live streaming preview region, present a live streaming presentation page corresponding to the target live streaming entry identification; or a fourth presentation unit, configured to, in response to a trigger operation for the recommended live streaming entry identification, present a live streaming aggregation page corresponding to the recommended live streaming entry identification; in which the live streaming aggregation page is configured to present a plurality of recommended live streaming information flows; the plurality of recommended live streaming information flows comprise a live streaming information flow corresponding to the recommended live streaming entry identification; or a fifth presentation unit, configured to, in response to a trigger operation for the candidate live streaming information flow, present a live streaming presentation page corresponding to the candidate live streaming information flow.

In a possible implementation, the live streaming aggregation page is configured to present the plurality of recommended live streaming information flows in a target ranking order; and the live streaming information flow corresponding to the recommended live streaming entry identification corresponds to a first place in the target ranking order.

In a possible implementation, the information presentation apparatus 1100 further includes:

a sixth presentation unit, configured to, after the presenting the live streaming aggregation page corresponding to the recommended live streaming entry identification, in response to a trigger operation for a target live streaming information flow of the plurality of recommended live streaming information flows, present a live streaming presentation page corresponding to the target live streaming information flow.

In a possible implementation, the live streaming preview information flow presents object description information corresponding to the target live streaming entry identification; the information presentation apparatus 1100 further includes:

a state switching unit, configured to, after the presenting the channel page corresponding to the target live streaming entry identification, when a preset update condition is reached, switch the object description information from a first information presentation state to a second information presentation state on the channel page; in wihch a region occupied by the object description information in the second information presentation state on the channel page is smaller than a region occupied by the object description information in the first information presentation state on the channel page.

In a possible implementation, the information presentation apparatus 1100 further includes:

a first adjustment unit, configured to, after the presenting the channel page corresponding to the target live streaming entry identification, in response to a preset operation triggered for the channel page, adjust the live streaming preview region from a triggerable presentation state to a non-triggerable presentation state, adjust the live streaming entry recommendation region from a first presentation position to a second presentation position, and adjust the recommended information flow presentation region from a first presentation region to a second presentation region; in which the second presentation position is higher than the first presentation position on the channel page; and space occupied by the second presentation region on the channel page is greater than space occupied by the first presentation region on the channel page.

In a possible implementation, the information presentation apparatus 1100 further includes:

a second adjustment unit, configured to, after the adjusting the live streaming entry recommendation region from the first presentation position to the second presentation position, and adjusting the recommended information flow presentation region from the first presentation region to the second presentation region, in response to a preset operation triggered for the channel page, cancel the presenting of the live streaming preview region, adjust the live streaming entry recommendation region from the second presentation position to a third presentation position, and adjust the recommended information flow presentation region from the second presentation region to a third presentation region; in which the third presentation position is higher than the second presentation position on the channel page; and space occupied by the third presentation region on the channel page is greater than space occupied by the second presentation region on the channel page.

In a possible implementation, the information presentation apparatus 1100 further includes:

a third adjustment unit, configured to, after the adjusting the live streaming entry recommendation region from the second presentation position to the third presentation position, and adjusting the recommended information flow presentation region from the second presentation region to the third presentation region, in response to a preset operation triggered for the channel page, cancel the presenting of the live streaming entry recommendation region, and adjust the recommended information flow presentation region from the third presentation region to a fourth presentation region; in which space occupied by the fourth presentation region on the channel page is greater than space occupied by the third presentation region on the channel page.

In a possible implementation, the channel page presents prompt information corresponding to the target live streaming entry identification; the prompt information is configured to describe an access operation of a corresponding live streaming presentation page for the target live streaming entry identification; the information presentation apparatus 1100 further includes:

a seventh presentation unit, configured to, after the canceling the presenting of the live streaming preview region, in response to the access operation, present the live streaming presentation page corresponding to the target live streaming entry identification.

In a possible implementation, the recommended information flow presentation region presents a plurality of candidate category labels; the second adjustment unit is further configured to switch the plurality of candidate category labels from a first aggregated presentation state to a second aggregated presentation state when the recommended information flow presentation region is adjusted from the second presentation region to the third presentation region; in which the plurality of candidate category labels in the first aggregated presentation state are configured for presentation in sequence in response to a preset sliding operation;

the information presentation apparatus 1100 further includes:

an eighth presentation unit, configured to, in response to a trigger operation for a control to be used corresponding to the second aggregated presentation state, present a category aggregation presentation page; in which the category aggregation presentation page presents a plurality of recommended category labels; and the plurality of recommended category labels comprise the plurality of candidate category labels.

In a possible implementation, the channel page satisfies at least one of following conditions:

the live streaming entry recommendation region is configured to present a recommended live streaming entry identification corresponding to at least one first category; each of the at least one first category is different;

the recommended information flow presentation region is configured to present a candidate live streaming information flow corresponding to at least one second category; each of the at least one second category is different;

a position of the live streaming preview region in the channel page is located above a position of the live streaming entry recommendation region in the channel page; a position of the live streaming entry recommendation region in the channel page is above a position of the recommended information flow presentation region in the channel page;

a size of the live streaming preview region is equal to a sum of a size of the live streaming entry recommendation region and a size of the recommended information flow presentation region;

the recommended information flow presentation region is configured to present a plurality of candidate live streaming information flows; and the plurality of candidate live streaming information flows comprise live streaming information flows corresponding to other candidate live streaming entry identifications except for the target live streaming entry identification in the plurality of candidate live streaming entry identifications.

Based on the above relevant contents of the information presentation apparatus 1100, it can be seen that with regard to the information presentation apparatus 1100 provided by the embodiments of the present disclosure, when a live streaming entry aggregation interface (for example, a first page of a shopping mall) is being presented on the information presentation apparatus 1100, and a plurality of candidate live streaming entry identifications (for example, live streaming account identifications, etc.) are presented on the live streaming entry aggregation interface, when the information presentation apparatus 1100 receives a trigger operation (for example, an operation of clicking a certain candidate live streaming entry identification, etc.) for the live streaming entry aggregation interface, the information presentation apparatus 1100 determines a target live streaming entry identification from the plurelity of candidate live streaming entry identifications, and present a channel page (e.g., a selected live streaming page, etc.) corresponding to the target live streaming entry identification. The channel page includes a live streaming preview region, a live streaming entry recommendation region, and a recommended information flow presentation region, the live streaming preview region is configured to play a live streaming preview information flow corresponding to the target live streaming entry identification, the live streaming entry recommendation region is configured to present a recommended live streaming entry identification (e.g., an account identification of a live streaming room recommended under the categories of My follow, Brand Officials, Celebrity and Big shot, etc.), and the recommended information flow presentation region is configured to present a candidate live streaming information flow (e.g., a live streaming information flow of a live streaming room recommended under the categories of recommendation, women's dress, clothing, etc.).

It can be seen that with regard to the above channel page, the channel page not only presents the live streaming preview information flow corresponding to the target live streaming entry identification, but also presents some recommended live streaming entry identifications and some candidate live streaming information flows, so that the user can not only directly access/enter a live streaming room identified by the target live streaming entry identification for viewing through the live streaming preview information flow, but also can enter other live streaming rooms for viewing through the recommended live streaming entry identifications and the candidate live streaming information flows. Therefore, the live viewing experience of the user can be better satisfied, and the user experience can be effectively improved.

In addition, the embodiments of the present disclosure further provide an electronic device, device includes a processor and a memory; the memory is configured to store instructions or computer programs; and the processor is configured to execute the instructions or computer programs in the memory to cause the electronic device to perform any implementation of the information presentation method provided by the embodiments of the present disclosure.

Figure 12:
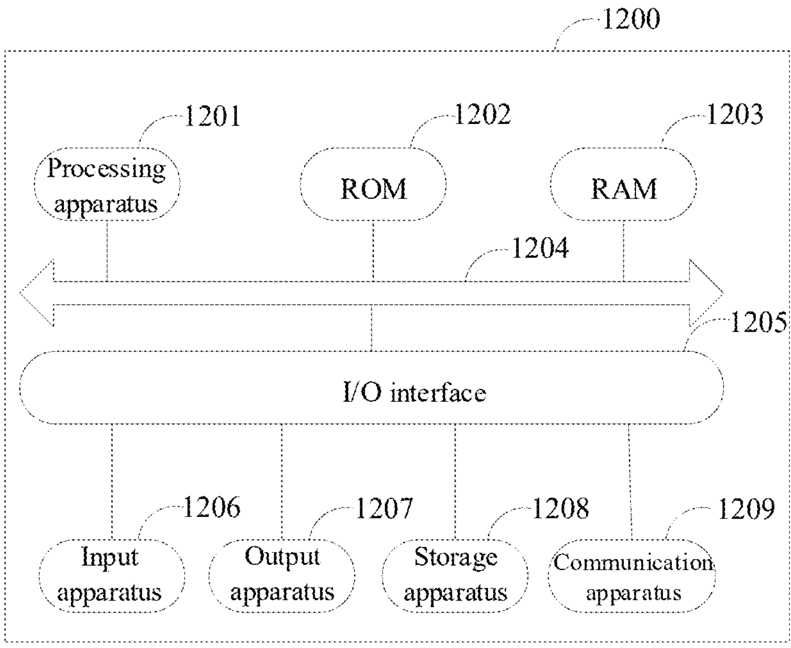
FIG. 12 is a structural schematic diagram of an electronic device provided by an embodiment of the present disclosure.

Referring to FIG. 12, FIG. 12 illustrates a schematic structural diagram of an electronic device 1200 suitable for implementing some embodiments of the present disclosure. The terminal devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 12 is merely an example, and should not pose any limitation to the functions and the range of use of the embodiments of the present disclosure.

As illustrated in FIG. 12, the electronic device 1200 may include a processing apparatus 1201 (e.g., a central processing unit, a graphics processing unit, etc.), which can perform various suitable actions and processing according to a program stored in a read-only memory (ROM) 1202 or a program loaded from a storage apparatus 1208 into a random-access memory (RAM) 1203. The RAM 1203 further stores various programs and data required for operations of the electronic device 1400. The processing apparatus 1201, the ROM 1202, and the RAM 1203 are interconnected by means of a bus 1204. An input/output (I/O) interface 1205 is also connected to the bus 1204.

Usually, the following apparatus may be connected to the I/O interface 1205: an input apparatus 1206 including, for example, a touch screen, a touch pad, a keyboard, a mouse, a camera, a microphone, an accelerometer, a gyroscope, or the like; an output apparatus 1207 including, for example, a liquid crystal display (LCD), a loudspeaker, a vibrator, or the like; a storage apparatus 1208 including, for example, a magnetic tape, a hard disk, or the like; and a communication apparatus 1409. The communication apparatus 1209 may allow the electronic device 1200 to be in wireless or wired communication with other devices to exchange data. While FIG. 12 illustrates the electronic device 1400 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 1209 and installed, or may be installed from the storage apparatus 1208, or may be installed from the ROM 1202. When the computer program is executed by the processing apparatus 1201, the above functions defined in the methods of some embodiments of the present disclosure are performed.

The electronic device provided by the embodiments of the present disclosure belongs to the same inventive concept as the method provided by the above embodiments. The technical details not described in detail in the present embodiment may be referred to the above embodiments. The present embodiment has the same advantageous effects as the above embodiments.

The embodiments of the present disclosure further provide a computer-readable medium, the computer-readable medium stores instructions or computer programs, when the instructions or computer programs run on a device, the device is caused to perform any implementation of the information presentation method provided by the embodiments of the present disclosure.

It should be noted that the above computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above computer-readable medium may be included in the above electronic device, or may also exist alone without being assembled into the electronic device.

The above computer-readable medium carries one or more programs, and when the one or more programs are excuted by the electronic device, the electronic device is caused to perform the above method.

The computer program codes for performing the operations of the present disclosure may be written in one or more programming languages or a combination thereof. The above programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

It should be noted that the various embodiments in the present disclosure are described in a progressive manner, with each embodiment focusing on the differences from other embodiments, and similar parts between the various embodiments may be referred to each other. For the systems or apparatuses disclosed in the embodiments, because they correspond to the methods disclosed in the embodiments, the description is relatively simple, and the relevant parts may refer to the description of the methods for details.

It should be understood that, in the present disclosure, "at least one (item)" refers to one or more, and "a plurality of" refers to two or more. "And/or" is used to describe the association relationship between associated objects, indicating that there may be three relationships. For example, "A and/or B" may indicate: only A exists, only B exists, and both A and B exist simultaneously, where A, B may be singular or plural. The character "/" generally indicates that the associated objects before and after are in a kind of "or" relationship. "At least one (item)" or similar expressions refer to any combination of these items, including any combination of single (item) or multiple (items). For example, at least one (item) of a, b, or c may indicate: a, b, c, "a and b", "a and c", "b and c", or "a, b, and c", where a, b, and c may be singular or plural.

It should be noted that in the present disclosure, relational terms such as "first," "second," etc. are only used to distinguish one entity or operation from another entity or operation, and do not necessarily require or imply the existence of any actual relationship or order between these entities or operations. Furthermore, the terms "comprise," "comprising," "include," "including," etc., or any other variant thereof are intended to cover non-exclusive inclusion, such that a process, method, article or device comprising a set of elements includes not only those elements, but also other elements not expressly listed, or other elements not expressly listed for the purpose of such a process, method, article or device, or elements that are inherent to such process, method, article or device. Without further limitation, an element defined by the phrase "includes a . . . " does not preclude the existence of additional identical elements in the process, method, article or device that includes the element.

The steps of a method or algorithm described in connection with the embodiments disclosed herein may be implemented directly in a hardware, a software module executed by a processor, or a combination of the both. The software module may be in an RAM, a memory, an ROM, an electrically programmable ROM, an electrically erasable programmable ROM, a register, a hard disk, a removable disk, a CD-ROM, or any other form of storage medium known in the art.

The previous descriptions of the embodimentss of the present disclosure are provided to enable any person skilled in the art to achive or use the present disclosure. Various modifications to these embodiments will be obvious to those skilled in the art. The generic principles defined herein may be implemented in other embodiments without departing from the spirit or scope of the present disclosure. Thus, the present disclosure is not limited to the embodiments shown herein but accords with the widest scope consistent with the principles and novel features disclosed herein.

The invention claimed is:

1. An information presentation method, wherein the method comprises:

presenting a live streaming entry aggregation interface, wherein the live streaming entry aggregation interface presents a plurality of candidate live streaming entry identifications; and in response to a trigger operation for the live streaming entry aggregation interface, determining a target live streaming entry identification from the plurality of candidate live streaming entry identifications, wherein the target live streaming entry identification comprises an identifier of a first live streaming room associated with a first live streaming account:

presenting a channel page corresponding to the target live streaming entry identification, wherein the channel page comprises a live streaming preview region, a live streaming entry recommendation region, and a recommended information flow presentation region;

playing a live streaming preview information flow corresponding to the target live streaming entry identification in the live streaming preview region;

presenting, in the live streaming entry recommendation region, an identifier of at least one recommended live streaming account, corresponding to at least one predetermined account category, that is different from the first live streaming account; and presenting, in the recommended information flow presentation region, information associated with at least one second live streaming room, corresponding to at least one predetermined room category, that is different from the first live streaming room.

2. The method according to claim 1, wherein the method further comprises:

in response to a trigger operation for the live streaming preview region, presenting a live streaming presentation page corresponding to the target live streaming entry identification.

3. The method according to claim 1, in response to a trigger operation for the identifier of the at least one recommended live streaming account, presenting a live streaming aggregation page corresponding to the at least one recommended live streaming account, wherein the live streaming aggregation page is configured to present a plurality of recommended live streaming information flows in a target ranking order; and the live streaming information flow corresponding to the identifier of the at least one recommended live streaming account corresponds to a first place in the target ranking order.

4. The method according to claim 1, wherein the live streaming preview information flow presents object description information corresponding to the target live streaming entry identification;

after the presenting the channel page corresponding to the target live streaming entry identification, the method further comprises:

when a preset update condition is reached, switching the object description information from a first information presentation state to a second information presentation state on the channel page; wherein a region occupied by the object description information in the second information presentation state on the channel page is smaller than a region occupied by the object description information in the first information presentation state on the channel page.

5. The method according to claim 1, wherein after the presenting the channel page corresponding to the target live streaming entry identification, the method further comprises:

in response to a preset operation triggered for the channel page, adjusting the live streaming preview region from a triggerable presentation state to a non-triggerable presentation state, adjusting the live streaming entry recommendation region from a first presentation position to a second presentation position, and adjusting the recommended information flow presentation region from a first presentation region to a second presentation region; wherein the second presentation position is higher than the first presentation position on the channel page; space occupied by the second presentation region on the channel page is greater than space occupied by the first presentation region on the channel page.

6. The method according to claim 5, wherein after the adjusting the live streaming entry recommendation region from the first presentation position to the second presentation position, and adjusting the recommended information flow presentation region from the first presentation region to the second presentation region, the method further comprises:

in response to a preset operation triggered for the channel page, canceling the presenting of the live streaming preview region, adjusting the live streaming entry recommendation region from the second presentation position to a third presentation position, and adjusting the recommended information flow presentation region from the second presentation region to a third presentation region; wherein the third presentation position is higher than the second presentation position on the channel page; and space occupied by the third presentation region on the channel page is greater than space occupied by the second presentation region on the channel page.

7. The method according to claim 6, wherein after the adjusting the live streaming entry recommendation region from the second presentation position to the third presentation position, and adjusting the recommended information flow presentation region from the second presentation region to the third presentation region, the method further comprises:

in response to a preset operation triggered for the channel page, canceling the presenting of the live streaming entry recommendation region, and adjusting the recommended information flow presentation region from the third presentation region to a fourth presentation region; wherein space occupied by the fourth presentation region on the channel page is greater than space occupied by the third presentation region on the channel page.

8. The method according to claim 6, wherein the channel page presents prompt information corresponding to the target live streaming entry identification; the prompt information is configured to describe an access operation of a live streaming presentation page corresponding to the target live streaming entry identification;

after the canceling the presenting of the live streaming preview region, the method further comprises:

in response to the access operation, presenting the live streaming presentation page corresponding to the target live streaming entry identification.

9. The method according to claim 6, wherein the at least one predetermined account category comprises a plurality of candidate categories, and wherein the recommended information flow presentation region presents a plurality of candidate category labels corresponding to the plurality of candidate categories;

the method further comprises:

switching the plurality of candidate category labels from a first aggregated presentation state to a second aggregated presentation state when the recommended information flow presentation region is adjusted from the second presentation region to the third presentation region; wherein the plurality of candidate category labels in the first aggregated presentation state are configured for presentation in sequence in response to a preset sliding operation; and in response to a trigger operation for a control to be used corresponding to the second aggregated presentation state, presenting a category aggregation presentation page; wherein the category aggregation presentation page presents a plurality of recommended category labels; and the plurality of recommended category labels comprise the plurality of candidate category labels.

10. The method according to claim 1, wherein the channel page satisfies at least one of following conditions:

each of the at least one predetermined account category is different;

each of the at least one predetermined room category is different;

a position of the live streaming preview region in the channel page is located above a position of the live streaming entry recommendation region in the channel page; a position of the live streaming entry recommendation region in the channel page is located above a position of the recommended information flow presentation region in the channel page;

a size of the live streaming preview region is equal to a sum of a size of the live streaming entry recommendation region and a size of the recommended information flow presentation region;

the at least one second live streaming room comprises a plurality of candidate live streaming information flows; and the plurality of candidate live streaming information flows comprise live streaming information flows corresponding to other candidate live streaming entry identifications except for the target live streaming entry identification in the plurality of candidate live streaming entry identifications.

11. An electronic device, wherein the device comprises a processor and a memory;

the memory is configured to store instructions or computer programs; and the processor is configured to execute the instructions or computer programs in the memory to cause the electronic device to:

present a live streaming entry aggregation interface, wherein the live streaming entry aggregation interface presents a plurality of candidate live streaming entry identifications; and in response to a trigger operation for the live streaming entry aggregation interface, determine a target live streaming entry identification from the plurality of candidate live streaming entry identifications, wherein the target live streaming entry identification comprises an identifier of a first live streaming room associated with a first live streaming account;

present a channel page corresponding to the target live streaming entry identification, wherein the channel page comprises a live streaming preview region, a live streaming entry recommendation region, and a recommended information flow presentation region;

play a live streaming preview information flow corresponding to the target live streaming entry identification in the live streaming preview region;

present, in the live streaming entry recommendation region, an identifier of at least one recommended live streaming account, corresponding to at least one predetermined account category, that is different from the first live streaming account; and present, in the recommended information flow presentation region, information associated with at least one second live streaming room, corresponding to at least one predetermined room category, that is different from the first live streaming room.

12. A non-transitory computer-readable medium, wherein the computer-readable medium stores instructions or computer programs, when the instructions or computer programs run on a device, the device is caused to perform an information presentation method, wherein the method comprises:

presenting a live streaming entry aggregation interface, wherein the live streaming entry aggregation interface presents a plurality of candidate live streaming entry identifications; and in response to a trigger operation for the live streaming entry aggregation interface, determining a target live streaming entry identification from the plurality of candidate live streaming entry identifications, wherein the target live streaming entry identification comprises an identifier of a first live streaming room associated with a first live streaming account;

presenting a channel page corresponding to the target live streaming entry identification, wherein the channel page comprises a live streaming preview region, a live streaming entry recommendation region, and a recommended information flow presentation region;

playing a live streaming preview information flow corresponding to the target live streaming entry identification in the live streaming preview region;

presenting, in the live streaming entry recommendation region, an identifier of at least one recommended live streaming account, corresponding to at least one predetermined account category, that is different from the first live streaming account; and presenting, in the recommended information flow presentation region, information associated with at least one second live streaming room, corresponding to at least one predetermined room category, that is different from the first live streaming room.

13. The method according to claim 1, wherein the method further comprises:

in response to a trigger operation for the identifier of the at least one recommended live streaming account, presenting a live streaming aggregation page corresponding to the identifier of the at least one recommended live streaming account; wherein the live streaming aggregation page is configured to present a plurality of recommended live streaming information flows; the plurality of recommended live streaming information flows comprise a live streaming information flow corresponding to the identifier of the at least one recommended live streaming account.

14. The method according to claim 1, wherein the method further comprises:

in response to a trigger operation for the information associated with at least one second live streaming room, presenting a live streaming presentation page corresponding to the at least one second live streaming room.

15. The method according to claim 13, wherein after the presenting the live streaming aggregation page corresponding to the identifier of the at least one recommended live streaming account, the method further comprises:

in response to a trigger operation for a target live streaming information flow of the plurality of recommended live streaming information flows, presenting a live streaming presentation page corresponding to the target live streaming information flow.

16. The electronic device according to claim 11, wherein the electronic device is further caused to:

in response to a trigger operation for the live streaming preview region, present a live streaming presentation page corresponding to the target live streaming entry identification.

17. The electronic device according to claim 11, wherein the electronic device is further caused to:

in response to a trigger operation for the identifier of the at least one recommended live streaming account, present a live streaming aggregation page corresponding to the identifier of the at least one recommended live streaming account; wherein the live streaming aggregation page is configured to present a plurality of recommended live streaming information flows; the plurality of recommended live streaming information flows comprise a live streaming information flow corresponding to the identifier of the at least one recommended live streaming account.

18. The electronic device according to claim 11, wherein the electronic device is further caused to:

in response to a trigger operation for the information associated with at least one second live streaming room, present a live streaming presentation page corresponding to the at least one second live streaming room.

* * * * *